(12) United States Patent
Kakinuma et al.

(10) Patent No.: US 7,796,786 B2
(45) Date of Patent: Sep. 14, 2010

(54) IMAGE PROCESSING DEVICE, METHOD, AND PROGRAM

(75) Inventors: Takeshi Kakinuma, Kaizu (JP); Mitsunori Sugiura, Aichi (JP); Yoshinori Yamaguchi, Ichinomiya (JP); Takamitsu Ishikawa, Ichinomiya (JP); Masataka Kimura, Ichinomiya (JP)

(73) Assignee: OMRON Corporation, Kyoto (JP)

( * ) Notice: Subject to any disclaimer, the term of this patent is extended or adjusted under 35 U.S.C. 154(b) by 973 days.

(21) Appl. No.: 11/599,827

(22) Filed: Nov. 15, 2006

(65) Prior Publication Data

US 2007/0127788 A1 Jun. 7, 2007

(30) Foreign Application Priority Data

Dec. 2, 2005 (JP) .............................. 2005-349166

(51) Int. Cl.
*G06K 9/00* (2006.01)
(52) U.S. Cl. ...................... 382/118; 382/123; 382/151; 382/159; 382/190
(58) Field of Classification Search ................. 382/118, 382/123, 151, 159, 190
See application file for complete search history.

(56) References Cited

U.S. PATENT DOCUMENTS 5,280,530 A * 1/1994 Trew et al. .................. 382/103
7,406,184 B2 * 7/2008 Wolff et al. ................. 382/118

* cited by examiner

*Primary Examiner*—Matthew C Bella
*Assistant Examiner*—Mike Rahmjoo
(74) *Attorney, Agent, or Firm*—Osha • Liang LLP

(57) ABSTRACT

To prevent detection of facial images for whom detection is unnecessary, without reducing the detection ratio of registered players from facial images.

An image acquisition unit acquires an image taken by a camera, and provides the image to a masking process unit. The masking process unit reads a masking pattern that has already been adjusted by a masking pattern adjustment unit and a movable masking area setting unit so that characteristic quantities of a facial image that does not need to be recognized as a facial image cannot be detected, from a masking pattern recording unit. A masking process is applied to the image provided, and the masked image is provided to a facial image extraction unit. The facial image extraction unit extracts a rectangular shaped facial image, and provides the facial image to a transmission unit. The transmission unit transmits the rectangular facial image provided to a face recognition server.

9 Claims, 17 Drawing Sheets

IMAGE PROCESSING DEVICE, METHOD, AND PROGRAM

BACKGROUND OF THE INVENTION

1. Field of the Invention

The present invention relates to an image processing device, method, and program, and more particularly to an image processing device, method, and program that reduces erroneous detection as well as increases the detection rate of a registered person.

2. Description of the Related Art

Technology that reports the arrival of a registered person is becoming more common.

For example, technology has been proposed in which surveillance cameras are deployed at the entrances of gaming premises such as pachinko or pachislot parlors. Facial images of players taken by the surveillance cameras are compared with the facial images of registered players using facial recognition technology. Then, when a registered player arrives at the premises, the fact that a registered player has arrived is reported (for example Japanese Patent Application Laid-open No. 2002-279540).

However, in the method of checking for a registered player using a facial image extracted from an image taken by a surveillance camera provided near the entrance for example, if there is an image of a face on a poster, sign board or similar that is not a real person within the field of view of the camera, the image of the face on the poster or similar may be taken to be the facial image of a visitor to the premises, and unnecessary facial recognition processing is carried out repeatedly. Therefore a method of masking has been proposed in which an area in which surveillance is not required is set in the imaging area of surveillance (for example, Japanese Patent Application Laid-open No. 2001-245278).

SUMMARY OF THE INVENTION

However, in the facial image detection method in which a facial image is tracked and automatically detected in the field of view of the camera, if the imaging area is moved when the facial image of a person passes within the masking area, depending on the size of the masking area the facial images before and after passing through the masking area may be detected as different persons as a result of termination of the automatic detection of the facial image.

With the foregoing in view, the present invention is capable of accurately recognizing the facial images of actual visitors to a premises, in particular effectively masking facial images contained in posters or sign boards or similar, and eliminating unnecessary facial image recognition processing.

An image processing device according to one aspect of the present invention comprises: imaging means that takes an image; facial image extraction means that extracts a facial image from the image; masking pattern generation means that generates a masking pattern to mask a part of the image, and repeatedly changes the masking pattern until a state where a facial image other than the facial image of a visitor cannot be extracted from the image by the facial image extraction means; and recording means that records the masking pattern when the facial image extraction means cannot extract the facial image other than the facial image of a visitor from the image that has been masked using the masking pattern generated by the masking pattern generation means.

The masking pattern generation means may further comprise sub-division means that sub-divides the facial image into predetermined sub-division areas, and the masking pattern generation means generates masking patterns that mask a part of the facial image using units of the sub-division areas sub-divided by the sub-division means, and the position and size of the masking pattern is repeatedly changed in units of the sub-division areas sub-divided by the sub-division means until a state where a facial image other than the facial image of a visitor cannot be extracted from the image by the facial image extraction means.

The predetermined sub-division areas include areas of the sub-divided image in a scan line form, or areas of the sub-divided image in a matrix form.

If the predetermined sub-division areas are areas sub-divided in a matrix form, the masking pattern generation means may generate the masking pattern for masking by changing the size of part of the sub-divided area while successively moving the facial image in a whirlpool shape from an area in approximately the center of a facial image other than the facial image of a visitor.

The facial image other than the facial image of a visitor may be a facial image extracted by the facial image extraction means from an image taken by the imaging means under conditions in which no visitors are present.

The image processing device may further comprise: detection means that detects the positions of movement of movable equipment; and tracing means that traces the masking pattern generated by the masking pattern generation means in a state where the facial image generation means cannot extract a facial image from the image taken by the imaging means, based on the positions of movement detected by the detection means, wherein the masking pattern recording means records the masking pattern including the range that the masking pattern has been traced by the tracing means.

The surveillance device comprises: accumulation means that accumulates facial images of registered persons; masking means that masks the images using masking patterns recorded in the recording means according to claim 1; degree of similarity calculation means that calculates the degree of similarity between the facial images extracted by the facial image extraction means and the facial images of registered persons accumulated in the accumulation means, based on characteristic quantities for recognizing the facial images from the facial images extracted by the facial image extraction means from the images masked by the masking means; and determination means that determines whether a registered person is present or not based on the degree of similarity calculated by the degree of similarity calculation means.

An image processing method according to one aspect of the present invention comprises: an imaging step of taking an image; a facial image extraction step of extracting a facial image from the image; a masking pattern generation step of generating a masking pattern for masking a part of the image, and repeatedly changing the masking pattern until a state where a facial image other than the facial image of a visitor cannot be extracted from the image by the process in the facial image extraction step; and a recording step of recording the masking pattern when the facial image extraction means cannot extract a facial image other than the facial image of a visitor from the image that has been masked using the masking pattern generated in the process of the masking pattern generation step.

A program that is executed on a computer according to one aspect of the present invention comprises: an imaging step of taking an image; a facial image extraction step of extracting a facial image from the image; a masking pattern generation step of generating a masking pattern for masking a part of the image, and repeatedly changing the masking pattern until a state where a facial image other than the facial image of a visitor cannot be extracted from the image by the process in the facial image extraction step; and a recording step of recording the masking pattern when the facial image extraction means cannot extract a facial image other than the facial image of a visitor from the image that has been masked using the masking pattern generated in the process of the masking pattern generation step.

In the image processing device, method, and program according to an aspect of the present invention, images are taken, facial images are extracted from the images. A masking pattern for masking a part of the images is generated, and the masking pattern is repeatedly changed until facial images that are not facial images of visitors cannot be extracted from the images. The masking pattern is recorded when facial images that are not facial images of visitors cannot be extracted from the images that have been masked using the generated masking pattern.

In the image processing device according to one aspect of the present invention, imaging means that takes images is for the example a camera. The facial image extraction means that extracts facial images from the images is for example a facial image extraction unit. The masking pattern generation means that that generates a masking pattern to mask a part of the image, and repeatedly changes the masking pattern until a facial image that is not the facial image of a visitor cannot be extracted from the image by the facial image extraction means is for example a masking pattern adjustment unit. The recording means that records the masking pattern when the facial image extraction means cannot extract a facial image that is not the facial image of a visitor from the image that has been masked using the masking pattern generated by the masking pattern generation means is for example a masking pattern recording unit.

In other words, the masking pattern is recorded in the masking pattern recording means when the masking pattern generation means has generated and changed the masking pattern that masks a part of the facial image until a facial image cannot be extracted by the facial image extraction means from the images taken by the imaging means. Here, a facial image that is not the facial image of a visitor is a facial image extracted from an image taken under conditions where no visitors have arrived. More specifically, a facial image that is not the facial image of a visitor is for example a facial image on a poster or sign board on the wall within a gaming premises. In other words, by masking a part of a facial image included on a poster or sign board that is not the facial image of a visitor, it becomes impossible to extract the facial image. By making it impossible to extract a facial image that is not the facial image of a visitor, the degree of similarity with the facial images of the accumulated registered persons is calculated only for the facial images of genuine visitors, and it becomes possible to determine that a registered person has arrived based on the calculated degree of similarity. As a result, it is possible to eliminate the process of calculating the degree of similarity of facial images included in posters or sign boards that are not the facial images of visitors with the facial images of registered persons. Therefore it is possible to speed up the execution of the comparison of the facial images of genuine visitors with the facial images of registered persons. Also, when masking facial images that are not the facial images of visitors, only a part of the facial image is masked. Therefore, there is no effect on the calculation of the degree of similarity of the facial images of genuine visitors with the facial images of the registered persons. Therefore, it is possible to speed up the process without reducing the detection rate for detecting registered persons from among the visitors.

According to one aspect of the present invention, it is possible to eliminate waste as a result of the repeated processing of comparisons between facial images for which there is no necessity to process face recognition and registered persons. In addition it is possible to detect registered persons efficiently without reducing the detection rate of registered persons.

Also, according to an aspect of the present invention, it is possible to eliminate waste as a result of the repeated processing of comparisons between facial images that are not the facial images of visitors to the gaming premises and registered persons. In addition it is possible to process efficiently without reducing the detection rate of registered players.

DESCRIPTION OF THE PREFERRED EMBODIMENTS

Figure 1:
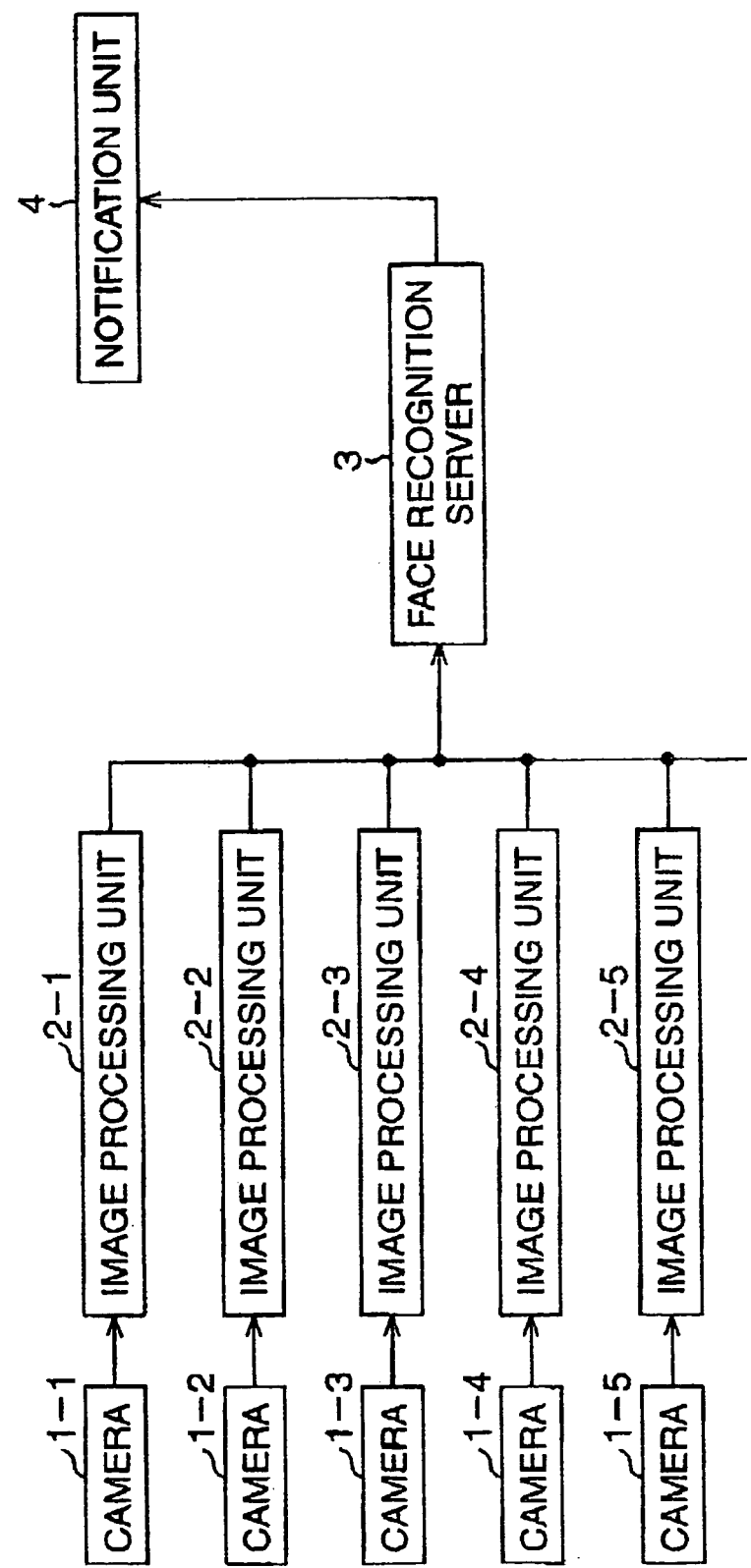
FIG. 1 shows the configuration of an embodiment of a registered player arrival notification system that applies the present invention.

The following is the explanation of the embodiments of the present invention. However, the following is a characterization of the corresponding relationship between the constituent features of the present invention and the description of the embodiments that explain the invention in detail. The description of the embodiments that supports the present invention is to confirm the description of the detailed explanation of the invention. Therefore, this is stated within the detailed explanation of the invention, but if there is an embodiment not described here that is an embodiment that corresponds to the constituent features of the present invention, this does not mean that that this embodiment does not correspond to the constituent features of the present invention. Conversely, even if an embodiment that complies with the constituent features is described here, this does not imply that the embodiment does not comply with constituent features other than the constituent features.

In other words, one aspect of the image processing device according to the present invention includes image taking means (for example, a camera 1 in FIG. 3) that takes images, facial image extraction means (for example, a facial image extraction unit 41b in FIG. 3) that extracts facial images from the images, masking pattern generation means (for example, a masking pattern adjustment unit 41 in FIG. 3) that generates a masking pattern that masks a part of the image, and repeatedly changes the masking pattern until a facial image that is not the facial image of a player cannot be extracted by the facial image extraction means, and recording means (for example, a masking pattern recording unit 42 in FIG. 3) that records the masking pattern when a facial image that is not the facial image of a visitor cannot be extracted by the facial image extraction means from the image by masking the image using a masking pattern generated by the masking pattern generation means.

The masking pattern generation means (for example, the masking pattern adjustment unit 41 in FIG. 3) may further include sub-division means (for example, a sub-division unit 41a in FIG. 3) that sub-divides the facial image in a predetermined sub-division area. A masking pattern that masks part of the image is generated by the masking pattern generation means, in units of sub-division area sub-divided by the sub-division means. The position and size of the masking pattern are successively changed in units of sub-division area sub-divided by the sub-division means until a facial image that is not the facial image of a visitor cannot be extracted from the image by the facial image extraction means.

The predetermined sub-division area may include areas sub-divided by scan lines or areas sub-divided by a matrix.

If the predetermined sub-division areas are areas sub-divided in a matrix form, the masking pattern generation means (for example the masking pattern adjustment unit 41 in FIG. 3) may generate the masking pattern for masking by changing the size of part of the sub-divided area while successively moving in a whirlpool shape from an area in approximately the center of a facial image that is not the facial image of a visitor.

The facial image that is not the facial image of a visitor may be a facial image extracted by the facial image extraction means (for example the facial image extraction unit 41b in FIG. 3) from an image taken by the imaging means under conditions in which there are no visitors present.

Figure 3:
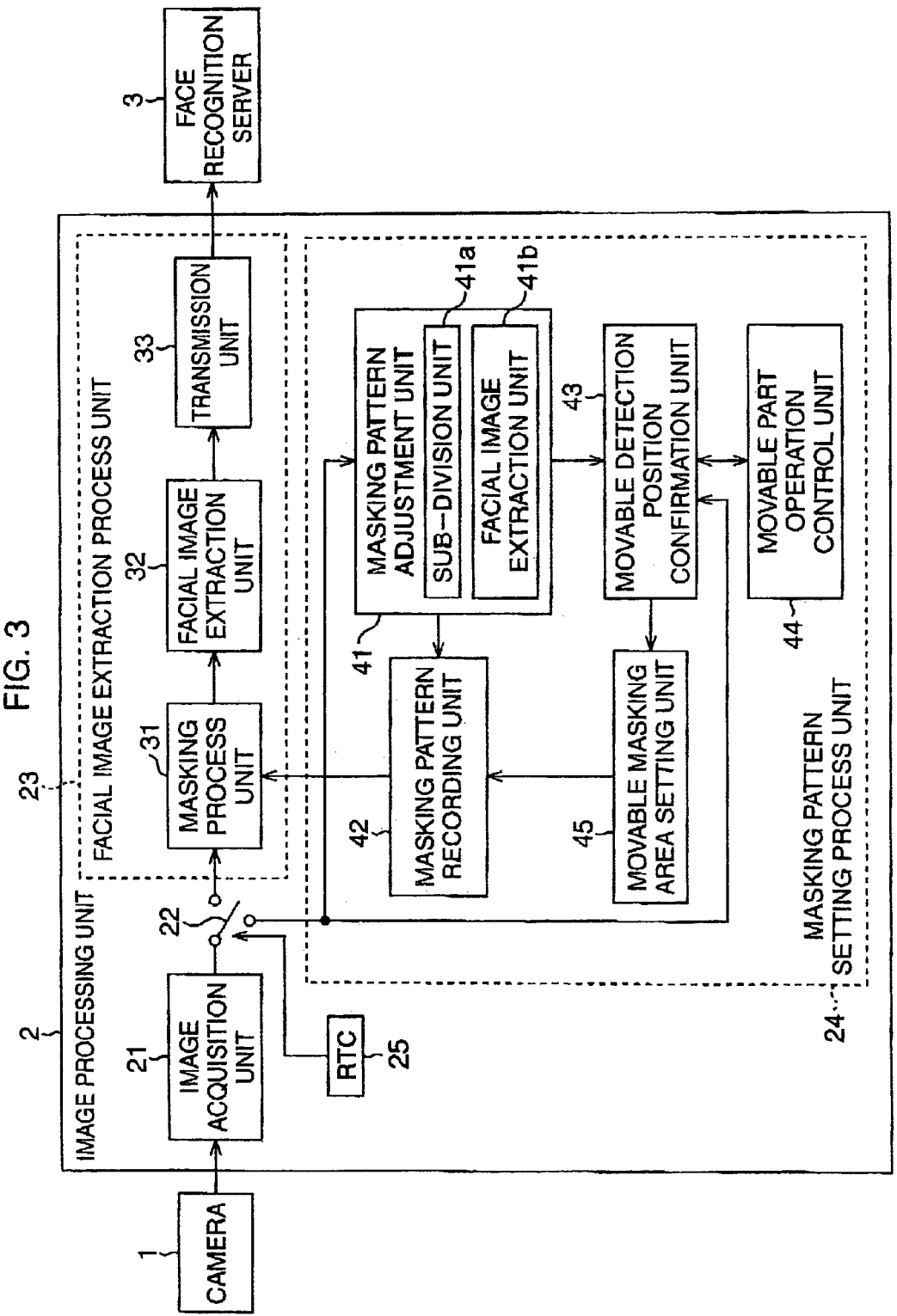
FIG. 3 is a diagram showing the configuration of an embodiment of the image processing unit of FIG. 1.

The image processing device may further comprise: detection means (for example the movable detection position confirmation unit 43 in FIG. 3) that detects the positions of movement of movable equipment; and tracing means that traces the masking pattern generated by the masking pattern generation means for which the facial image generation means cannot extract a facial image from the image taken by the imaging means, based on the positions of movement detected by the detection means, wherein the masking pattern recording means records the masking pattern including the range that the masking pattern was traced by the tracing means.

The surveillance device comprises: accumulation means (for example the registered player database 83 in FIG. 4) that accumulates the facial images of players; masking means (for example the masking process unit 31 in FIG. 3) that masks images using masking patterns recorded in the recording means according to claim 1; degree of similarity calculation means (for example the degree of similarity calculation unit 82 in FIG. 4) that calculates the degree of similarity between the facial images extracted by the facial image extraction means and the facial images of registered persons accumulated in the accumulation means, based on characteristic quantities for recognizing the facial images from the facial images extracted by the facial image extraction means from the images masked by the masking means; and determination means (for example the determination unit 84 in FIG. 4) that determines whether a registered person has arrived or not based on the degree of similarity calculated by the degree of similarity calculation means.

An image processing method according to one aspect of the present invention comprises: an imaging step (for example the process of Step S23 in the flowchart of FIG. 6) of taking an image; a facial image extraction step (for example the process of Step S24 in the flowchart of FIG. 6) of extracting a facial image from the image; a masking pattern generation step (for example the process of Step S28 in the flowchart of FIG. 6) of generating a masking pattern for masking a part of the image, and repeatedly changing the masking pattern until a facial image that is not the facial image of a visitor cannot be extracted from the image by the process in the facial image extraction step; and a recording step (for example the process of Step S37 in the flowchart of FIG. 6) of recording the masking pattern when the facial image extraction means cannot extract a facial image that is not the facial image of a visitor from the image that has been masked using the masking pattern generated in the process of the masking pattern generation step.

FIG. 1 is a diagram showing the configuration of an embodiment of a gaming premises registered player notification system according to the present invention.

Figure 2:
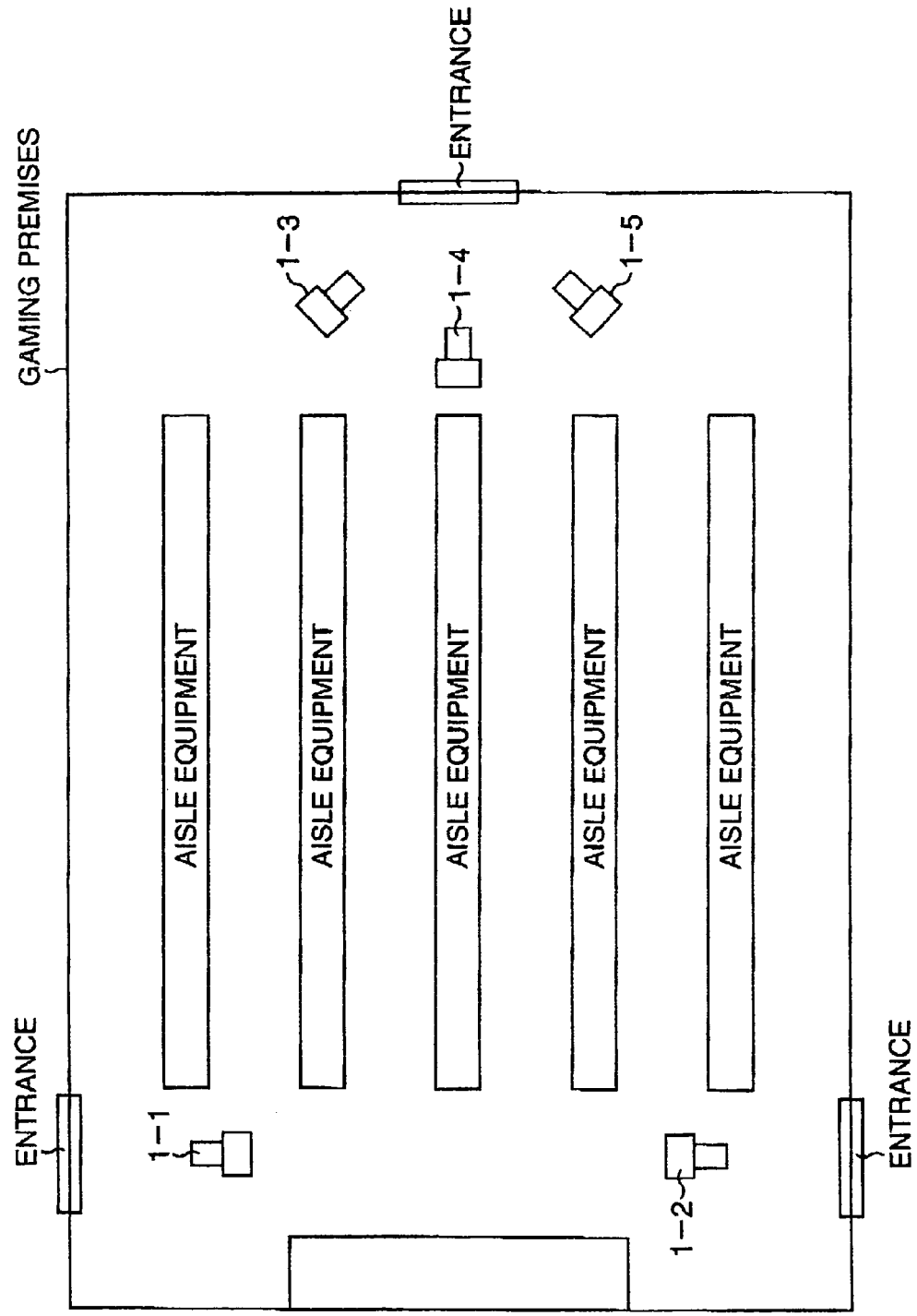
FIG. 2 is a diagram explaining an example of the layout of cameras in FIG. 1.

As shown in FIG. 2, cameras 1-1 through 1-5 are surveillance cameras positioned at the entrances to the gaming premises or provided within the gaming premises between islands in which game machines or similar are installed. Cameras 1-1 through 1-5 take images of players in their respective positions within the premises, and provide the images taken to image processing units 2-1 through 2-5. When it is not necessary to distinguish between cameras 1-1 through 1-5, or image processing units 2-1 through 2-5, they are simply referred to as camera 1 or image processing unit 2, and the rest of the configuration is named in the same way. Also, in the example in FIG. 2, camera 1 is shown for the example of the case where camera 1 is installed in five locations. However, the number of installation locations may be different from this number. Furthermore, camera 1 may be provided with panning, tilting, and zooming functions. Also, in FIG. 1 the image processing unit 2 is provided corresponding one for one with the camera 1. However, it is not necessary to provide one image processing unit 2 for each camera 1 in the case where for example time is divided among several cameras 1 and processing is carried out in parallel. For example, a single image processing unit 2 may process images provided by a plurality of cameras 1-1 through 1-5.

Based on images taken by cameras 1-1 through 1-5, the image processing units 2-1 through 2-5 extract facial images of players in the premises from the images, and provide the facial images to a face recognition server 3.

The face recognition server 3 receives facial images provided by the image processing unit 2, compares the facial images with the facial images of registered players that have been already registered, and determines whether the provided facial images are those of a registered player or not. Also, the face recognition server 3 supplies the results and the facial image to a notification unit 4.

When the notification unit 4 receives the facial images provided by the face recognition server 3 and the information on the determination results based on a registered player determination process, if the facial images received indicate a registered player then registered player information is generated, and the staff of the gaming premises is notified.

Next, the configuration of an embodiment of the image processing unit 2 is explained with reference to FIG. 3.

An image acquisition unit 21 receives images taken and provided by the camera 1, and via a switch 22 supplies the images to a facial image extraction process unit 23, or a masking pattern setting process unit 24. The switch 22 reads the current time based on time information generated by a real time clock (RTC) 25. If the time is a predetermined time, the facial image extraction process unit 23 is connected, and the images provided by the image acquisition unit 21 are provided to the facial image extraction process unit 23. If the time is not the predetermined time, the masking pattern setting process unit 24 is connected, and the images provided by the image acquisition unit 21 are provided to the masking pattern setting process unit 24.

In other words, the masking pattern setting process unit 24 only operates during the time period that the gaming premises is not open (or more specifically, during the time when there are no players in the premises, and staff are not walking around within the premises). That is, the masking process carried out on images by a masking process unit 31 of the facial image extraction process unit 23 is a process to prevent recognition as facial images of facial images on posters or sign boards or similar which do not have to be recognized as facial images of players. Therefore, the masking pattern setting process unit 24 that generates masking patterns operates during time periods when there are no players to be identified or members of staff present. In other words, the masking pattern setting process unit 24 operates during time periods that fulfill the condition that if a facial image is detected, it can be recognized as a facial image that does not have to be immediately recognized. In the following explanation, this set time is taken to be the time from start of operations of the gaming premises until the time the premises closes. However, provided the above condition is satisfied the time may be set to other times.

The facial image extraction process unit 23 reads the masking pattern set by the masking pattern setting process of the masking pattern setting process unit 24 from the masking pattern recording unit 42. After applying the masking to the image provided by the image acquisition unit 21, a facial image is extracted, and provided to the face recognition server 3.

The masking pattern setting process unit 24 sets the masking pattern used by the facial image extraction process unit 23 when extracting facial images as stated above, based on images provided by the image acquisition unit 21, and records the masking pattern in the masking pattern recording unit 42.

The masking process unit 31 of the facial image extraction process unit 23 applies a masking process to those images provided by the image acquisition unit 21 to the minimum extent necessary to prevent facial images included on posters or sign boards or similar that do not have to be recognized as players from being recognized as facial images, based on masking patterns recorded in the masking pattern recording unit 42. The images to which the masking has been applied are provided to a facial image extraction unit 32.

The facial image extraction unit 32 extracts a rectangular part that will form the facial image from the image provided by the masking process unit 31, and provides each facial image to a transmission unit 33. The transmission unit 33 transmits the facial image to the face recognition server 3.

The masking pattern adjustment unit 41 includes the sub-division unit 41a and the facial image extraction unit 41b. The facial image extraction unit 41b has the same configuration as the facial image extraction unit 32, and extracts rectangular shaped facial images from images provided by the image acquisition unit 21 via the switch 22.

The sub-division unit 41a sub-divides the rectangular shaped facial image extracted by the facial image extraction unit 41b into either a scan line form or a matrix form. The masking pattern adjustment unit 41 masks parts of the facial image successively, in units of sub-divided area (the minimum area of the sub-divided facial image) sub-divided by the sub-division unit 41a, and increases the masked area while successively moving within the rectangular shaped facial image. At this time the masking pattern adjustment unit 41 controls the facial image extraction unit 41b so that each time the masking is changed the facial image is extracted. The masking pattern for which a facial image cannot be extracted is provisionally recorded in the masking pattern recording unit 42, and the masking pattern information is provided to the movable detection position confirmation unit 43. In other words, a masking pattern is provisionally recorded in the masking pattern recording unit 42 in the minimum condition for which a facial image cannot be extracted.

When a masking pattern is provided by the masking pattern adjustment unit 41 to the movable detection position confirmation unit 43, a movable part operation control unit 44 is controlled, and movable parts whose movement can be controlled, such as automatic doors within the gaming premises or rotating advertisement towers, are operated. At this time the movable detection position confirmation unit 43 measures the range of movement that the position of the masking pattern provided by the masking pattern adjustment unit 41 moves, and provides the measurement result and the masking pattern to a movable masking area setting unit 45. The movable masking area setting unit 45 records together the masking area brought about by moving the masking pattern provided by the masking pattern adjustment unit 41 in accordance with the masking pattern movement range accompanying the movement of movable parts, and the provisionally registered masking pattern as stated above, as a masking pattern in the masking pattern recording unit 42. The masking pattern recording unit 42 records the masking pattern set by the masking pattern adjustment unit 41 and the movable masking area setting unit 45, and provides the masking process unit 31 the recorded masking pattern information.

Figure 4:
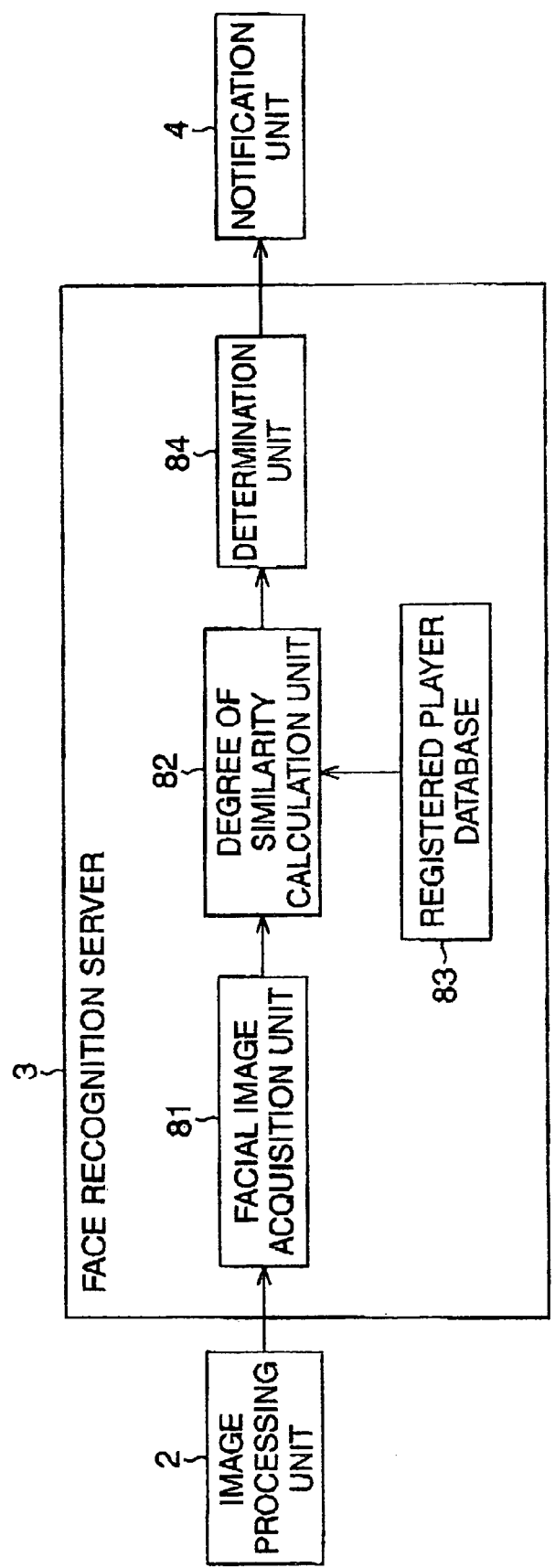
FIG. 4 is a diagram showing the configuration of an embodiment of the face recognition server of FIG. 1.

Next, the configuration of an embodiment of the face recognition server 3 is explained with reference to FIG. 4.

A facial image acquisition unit 81 receives facial images provided by the image processing unit 2, and provides them to the degree of similarity calculation unit 82. The degree of similarity calculation unit 82 compares the facial images provided by the facial image acquisition unit 81 with facial images registered in the registered player database 83 one by one, calculates the degree of similarity, and provides the calculation results to the determination unit 84. More specifically, the degree of similarity calculation unit 82 calculates various types of characteristic quantities of the face, and calculates the degree of similarity as the sum of their differences, average ratios, the sum of the ratios, or similar. The characteristic quantities of the face can include for example the distance between the eyes, the ratio of the distance from the chin to the forehead and the distance from the chin to the nose. Furthermore, for each facial image, the degree of similarity calculation unit 82 provides the facial image of the registered player having the highest degree of similarity obtained from among the degrees of similarity of each facial image of the registered players, and the degree of similarity to the taken facial image to the determination unit 84. Of course, other methods of calculating the degree of similarity may also be used. Also, the facial images of registered players registered in the registered player database 83 may be updated at any time with new registered players.

The determination unit 84 compares the degree of similarity of each facial image provided together with a person ID by the degree of similarity calculation unit 82 with specific threshold values for each facial image registered in the registered player database 83. Based on the results of the comparison, the determination unit 84 determines whether the facial image provided is the facial image of a registered player or not, and provides the determination result to the notification unit 4.

Here it is assumed for example that the degree of similarity is given by the sum of ratios, so that the closer to the registered facial image of a registered player the higher the value. An example is explained for the case where when the degree of similarity is a value higher than a predetermined threshold value the facial image is determined to be that of the registered player corresponding to that degree of similarity. However, if for example the degree of similarity is expressed by the sum of differences of the various characteristic quantities of the taken facial image and the registered facial image of the registered player, then if the degree of similarity is smaller than the threshold value the determination unit 84 considers the taken facial image to be the facial image of the registered player. Also, in the case of average ratios or similar, if the value is equal to or greater than a predetermined value within the range 0 through 1, if the value is close to 1 the persons are taken to be the same person.

Figure 5:
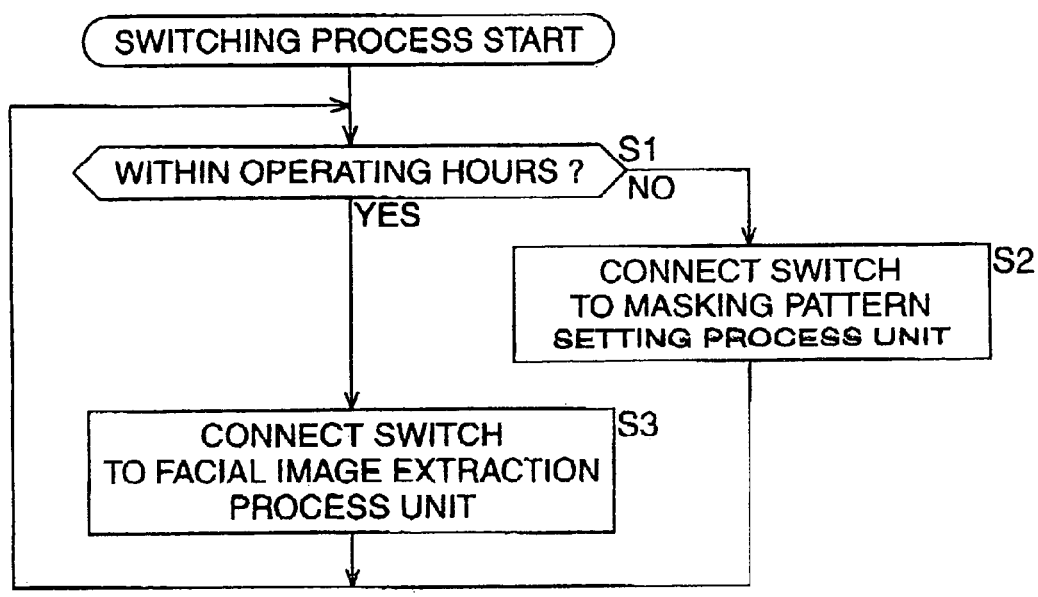
FIG. 5 is a flowchart explaining the switching process.

Next, the switching process by the switch 22 is explained with reference to the flowchart in FIG. 5.

In Step S1, the switch 22 queries the RTC 25 to determine whether the current time is within the operating hours or not. If for example it is determined that the time is outside operating hours in Step S2 the masking pattern setting unit 24 is connected, and the process returns to Step S1. On the other hand, if in Step S1 it is determined that the current time is within the operating hours, the switch 22 connects to the facial image extraction process unit 23, and the process returns to Step S1.

According to the above process, depending on the time period the switch 22 switches between the facial image extraction process unit 23 and the masking pattern setting unit 24. As a result, even though posters or sign boards are moved from day to day, by repeatedly carrying out the masking pattern setting process that is described later, it is possible to change the setting of the masking pattern without having to particularly change the setting of the image processing unit 2. As a result the facial image extraction process has good efficiency, and it is possible to avoid extracting facial images that are not actual visitors to the gaming premises, such as facial images on posters or sign boards or the like.

Figure 6:
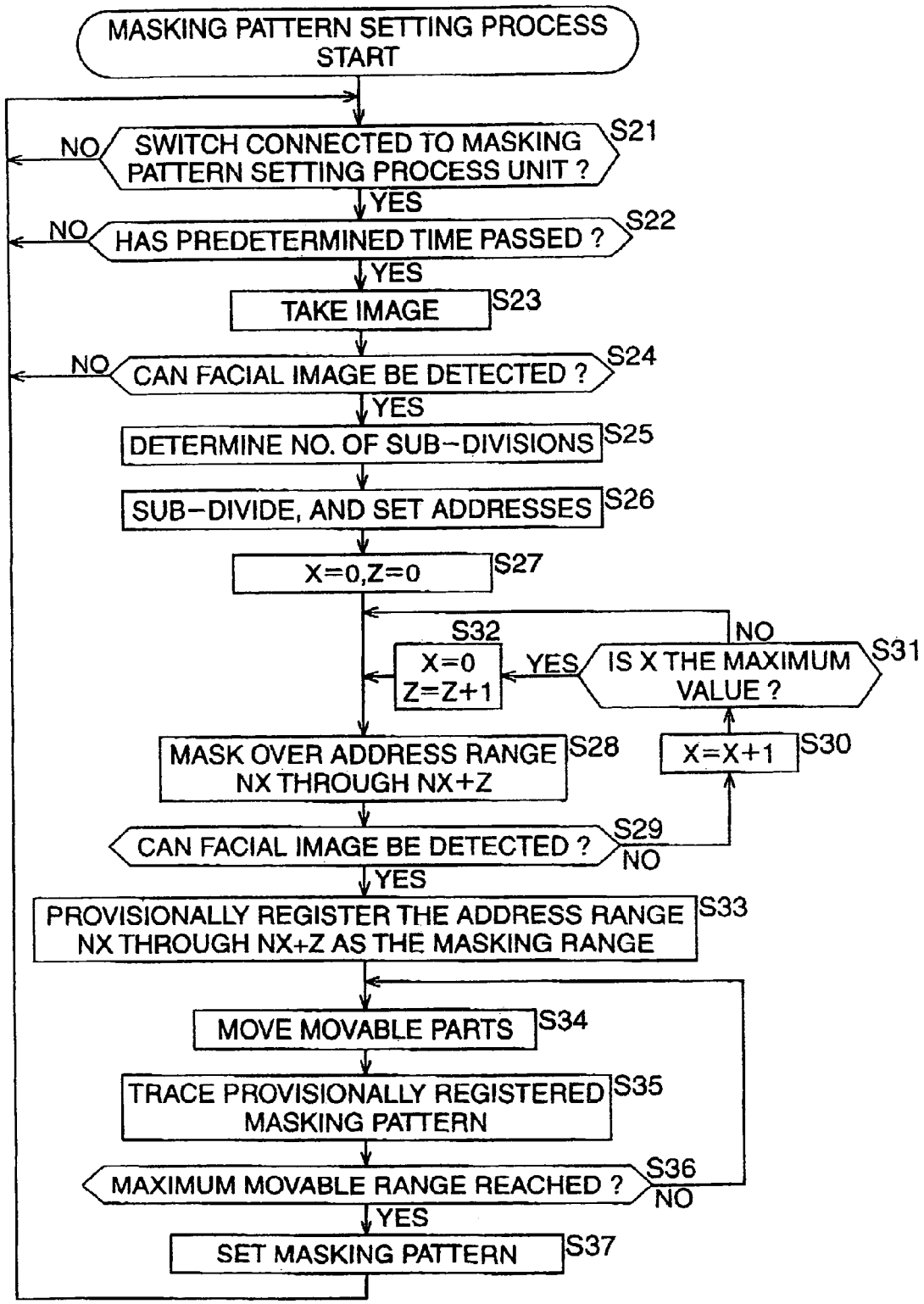
FIG. 6 is a flowchart explaining the masking pattern setting process when sub-dividing the facial image into scan lines.

Next, the masking pattern setting process by the image processing unit 2 of FIG. 3 is explained with reference to the flowchart in FIG. 6. The masking pattern setting process is a process for setting the masking pattern as referred to above.

In Step S21 the masking pattern adjustment unit 41 determines whether the switch 22 is connected to the masking pattern setting process unit 24 or not, and the process is repeated until it is determined that it is connected. Here if, for example, as a result of the process in Step S2 of the flowchart in FIG. 5 it is determined that the switch 22 is connected to the masking pattern setting process unit 24, the process proceeds to Step S22.

In Step S22 camera 1 determines whether a predetermined time has passed. If the predetermined time has not passed the process returns to Step S21. In other words, with the switch 22 connected to the masking pattern setting unit 24, the processes in Steps S21, S22 are repeated until the predetermined time has passed. An arbitrary time may be set as the predetermined time for the surveillance sampling time, for example, 250 ms may be used.

If the predetermined time has passed in Step S22, in Step S23 camera 1 takes an image of the area the camera 1 is set to take, and provides the image taken to the image processing unit 2. The image acquisition unit 21 of the image processing unit 2 receives the image that was provided, and provides the image to the masking pattern adjustment unit 41 and the movable detection position confirmation unit 43.

In Step S24, the masking pattern adjustment unit 41 controls the facial image extraction unit 41*b*, and determines whether a facial image can be extracted or not. In Step S24, if for example it is determined that it is not possible to extract a facial image, the process returns to Step S21. In other words, with the switch 22 connected to the masking pattern setting unit 24, after the predetermined period of time has passed the processes in Steps S21 through S24 are repeated until it is determined that a facial image can be extracted.

In Step S24, if it is determined by the facial image extraction unit 41*b* that a facial image can be extracted, in Step S25, the masking pattern adjustment unit 41 controls the facial image extraction unit 41*b*, extracts a rectangular shaped facial image, and provides the facial image to the sub-division unit 41*a*. Furthermore, the masking pattern adjustment unit 41 controls the sub-division unit 41*a* to determine the number of sub-divisions of the rectangular shaped facial image. At this time the facial image is reasonably small compared with the image provided by the image acquisition unit 21, so the sub-division unit 41*a* determines the number of sub-divisions taking for example the degree of resolution into account.

Figure 7:
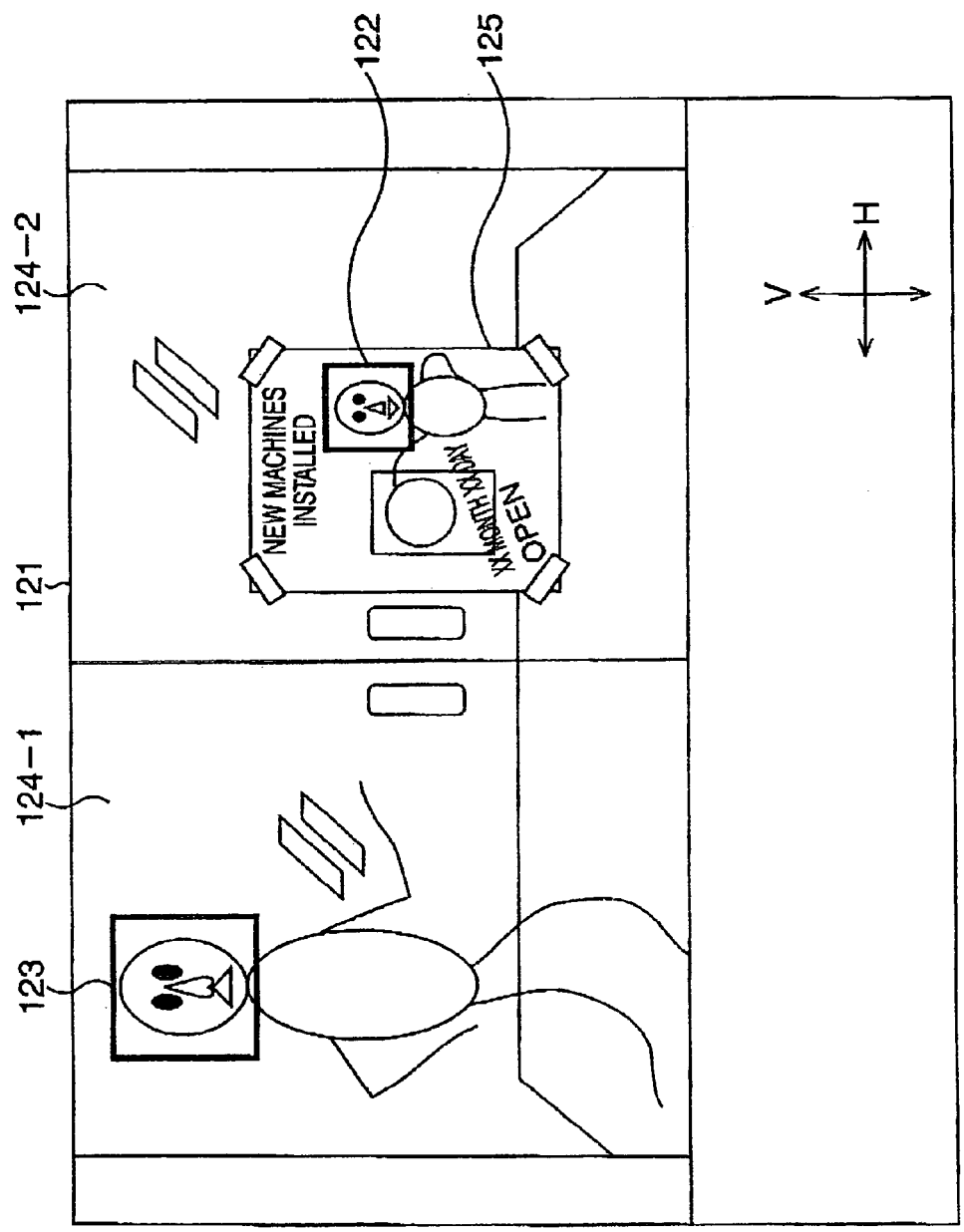
FIG. 7 is a diagram explaining the images taken by the image acquisition unit.

Here the rectangular facial image is for example in the case of an image 121 provided by the image acquisition unit 21 as shown in FIG. 7, a facial image 123 of a person walking past an automatic door 124-1, or a facial image 122 on a poster 125 fixed to an automatic door 124-2 in the image 121.

As stated above, masking is a process to prevent facial images on posters, sign boards, or similar within an image that do not need to be recognized as the facial images of players from being recognized as facial images. Therefore it is necessary that the masking pattern setting process that generates the masking patterns operates during the time period when there are no players that would be detected or staff members within the gaming premises. In other words, the masking pattern setting process must operate at a time when if a facial image is detected it can be immediately recognized as being a facial image that does not have to be detected. In other words, it is assumed that an image 121 that includes the facial image 123 of a member of staff as shown in FIG. 7 will not be provided by the image acquisition unit 21. Therefore, the explanation will proceed on the assumption that only the facial image 122 will be extracted from the image 121 as shown in FIG. 7.

Figure 8:
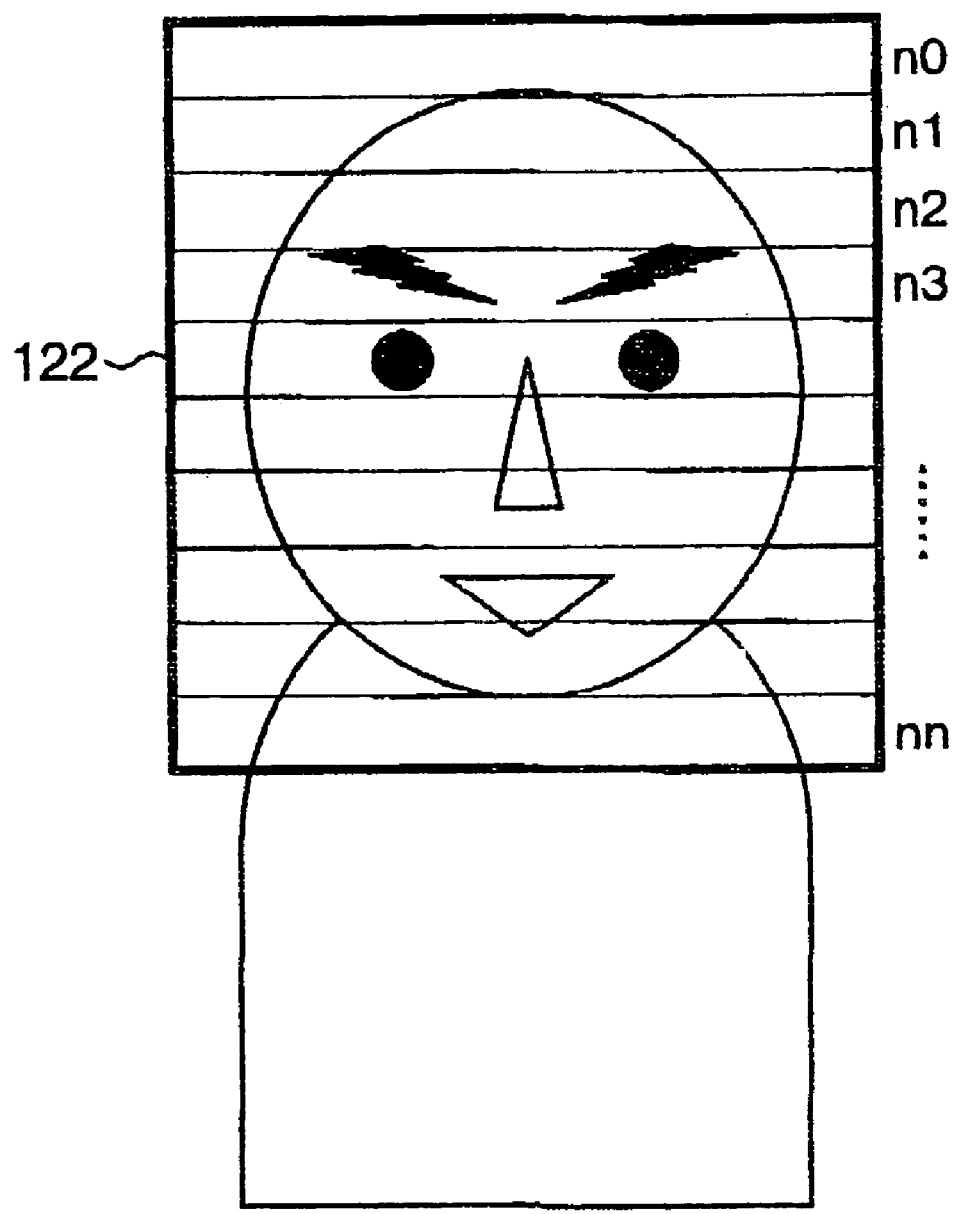
FIG. 8 is a diagram explaining the masking pattern setting process in the scan line sub-division process.

In Step S26, the sub-division unit 41*a* sub-divides the rectangular facial image into the determined number of sub-divisions. The sub-division unit 41*a* sub-divides the facial image with scan lines as shown in FIG. 8, and sets their address. In FIG. 8, the facial image 122 is sub-divided into n sub-divisions from top to bottom using horizontal scan lines, and each sub-divided part is allocated an address n0 through nn.

In Step S27, the masking pattern adjustment unit 41 initializes counters X and Z, that are not shown on the drawings, to zero. Here the counter X is an address counter, and the counter Z is a value indicating the minimum unit of the part of the masking scan line.

In Step S28, the masking pattern adjustment unit 41 masks the range from address nX through n(X+Z). In other words, at present X and Z are zero, so as shown in the left portion of FIG. 9 the masking area 131a is set in the topmost portion. Here, masking means a process of filling the masking area with black, white, or another color.

In Step S29, the masking pattern adjustment unit 41 controls the facial image extraction unit 41b to check whether a facial image can be extracted from the masked rectangular facial image. If it is possible to extract a facial image the process proceeds to Step S30. In other words, the facial image extraction unit 41b is the same as the facial image extraction unit 32, so if a facial image can be extracted then it indicates that with the present masking a facial image can be extracted that is unnecessary to process as a facial image. Therefore, the process proceeds to the process for changing the masking pattern (in other words, the process proceeds to Step S30).

In Step S30, the masking pattern adjustment unit 41 increments the counter X by 1. In Step S31, the masking pattern adjustment unit 41 determines whether the counter X has reached the maximum value. If the counter X is not the maximum value, the process returns to Step S28, and masking is applied again. At this time the counter X has been incremented by one, so the scan line masking pattern moves one line in the downward direction as shown in the second diagram from the left in FIG. 9, and the masking area 131b is applied to the portion one line down from the topmost portion.

Figure 9:
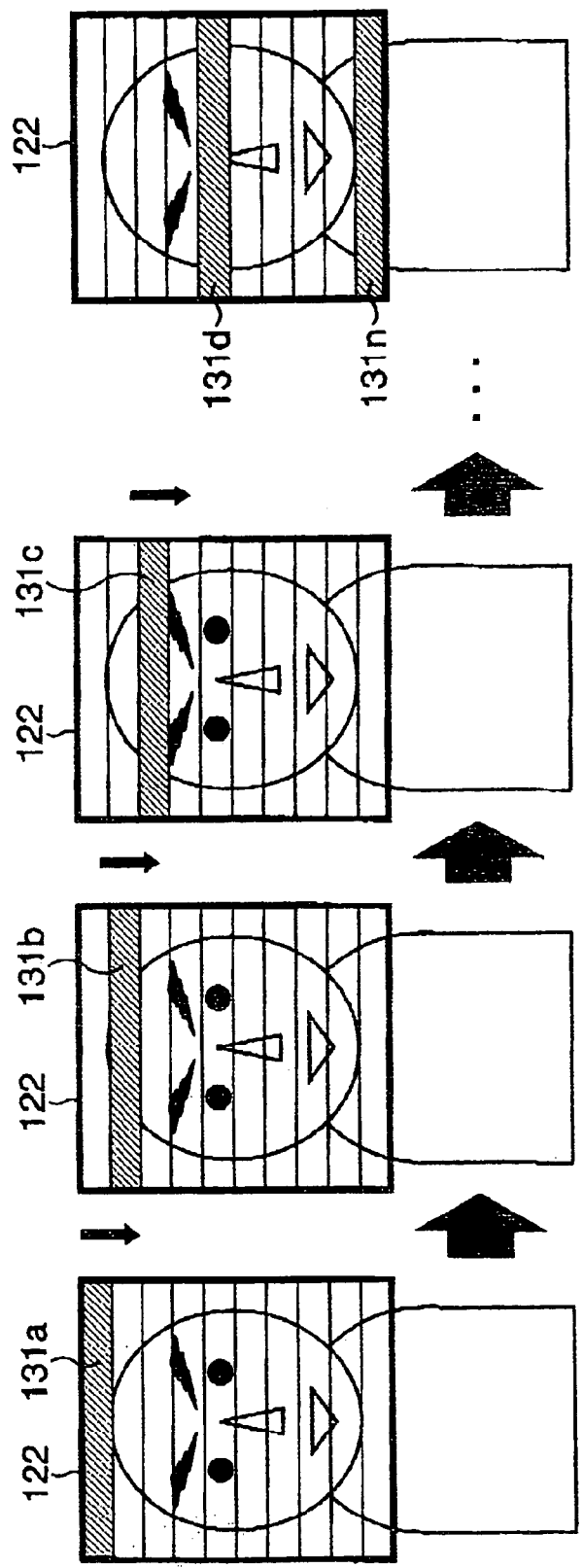
FIG. 9 is a diagram explaining the masking pattern setting process in the scan line sub-division process.

As a result, as shown in FIG. 9, the masked area is changed by proceeding successively in the direction to the right in FIG. 9, to masking area 131c, 131d, until a facial image cannot be extracted. Finally masking is applied to the masking area 131n in the lowest portion, as shown in the right of FIG. 9.

At this time, in Step S31, X has reached the maximum value, so in Step S32 the counter X is initialized to zero, and the counter Z is incremented. As a result, in Step S28, the masking pattern adjustment unit 41 masks over the range address n0 through n1. In other words, the area masked each time is changed to two lines, and the same process as described above is repeated, and the same process is repeated until a facial image cannot be extracted.

Then, in Step S29, if it is determined that a facial image cannot be extracted, in Step S33, the masking pattern adjustment unit 41 provisionally registers the masking pattern at that time in the masking pattern recording unit 42, and provides the provisionally registered masking pattern to the movable detection position confirmation unit 43.

In Step S34, the movable detection position confirmation unit 43 controls the movable part operation control unit 44 to operate movable parts within the premises. For example, the automatic doors 124-1, 124-2 in FIG. 7 and similar are operated to open and close.

In Step S35, the movable detection position confirmation unit 43 traces the masking pattern provided by the masking pattern adjustment unit 41 within the image provided by the image acquisition unit 21 in the process of Step S2 in accordance with the movement of the movable part.

In Step S36, the movable detection position confirmation unit 43 determines whether the masking pattern provided has reached the maximum movable range within image 121. If it has not reached the maximum movable range the process returns to Step S34, and the processes of Steps S34 through S36 are repeated until the maximum movable range has been reached.

Figure 10:
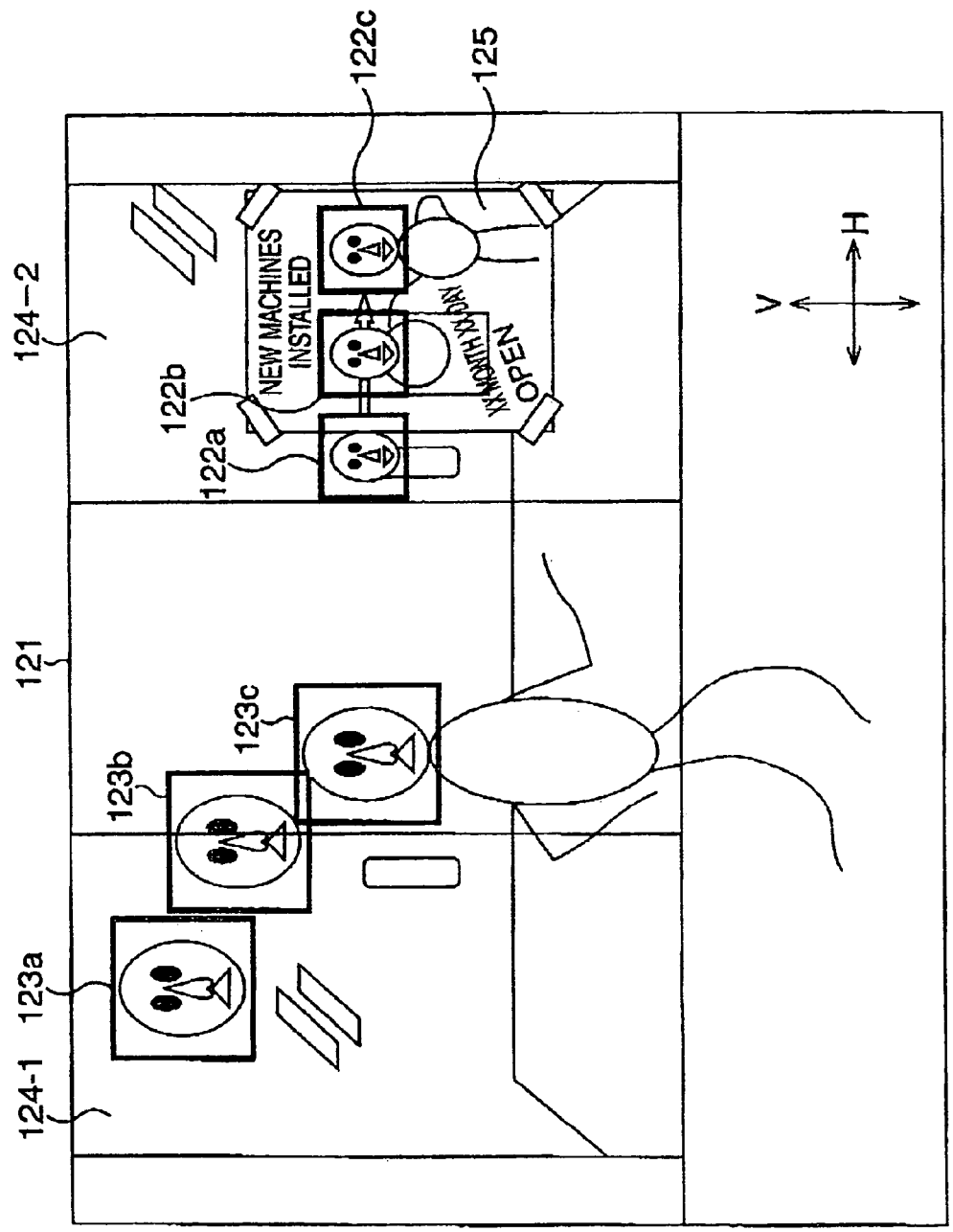
FIG. 10 is a diagram explaining tracing the masking area.

In other words, if the facial image 122 is in the attitude shown in FIG. 7, by operating the automatic doors 124-1, 124-2 until it is determined that the maximum range of movement is reached, the automatic doors are opened to the left and right respectively. Then as shown in FIG. 10, the facial image 122 traces the facial images 122a through 122c in that order, corresponding to the movements of the automatic door 124-2 on which the poster 125 is fixed. When the automatic door 124-2 is closed, the facial images 122c through 122a are traced in that order. Also, as shown in FIG. 10, although not the subject of masking, at this time if the facial image 123 is in the image 121, the facial images 123a through 123c are traced corresponding to the movement shown in the continuously provided images 121.

In the case of FIG. 10, the facial image 122a is in the same position as the position in FIG. 7. Therefore, as the doors 124-1, 124-2 open and close, the facial image 122 moves as far as the facial image 122c, and when the doors 124-1, 124-2 close the facial image 122 returns to the position of the facial image 122a. When the doors 124-1, 124-2 open again the image 122 moves as far as the facial image 122c. In this case the maximum range of movement can be confirmed to be the range from facial image 122a to facial image 122c. Therefore, in this case in Step S36 if it is determined that the maximum movable range has been reached, the process proceeds to Step S37.

Figure 11:
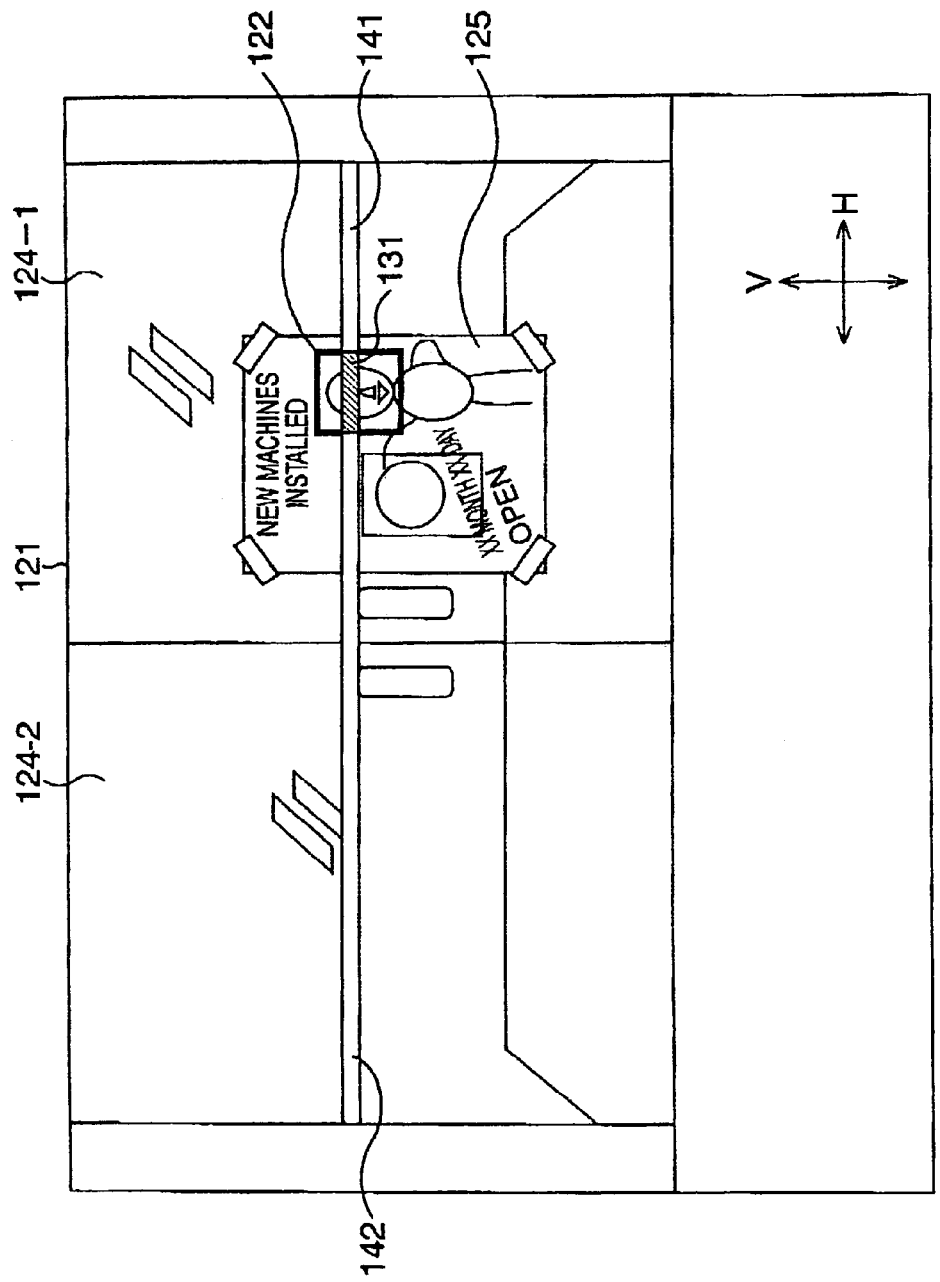
FIG. 11 is a diagram explaining the extension of the masking pattern accompanying the masking pattern movement due to a movable part.

In Step S37, the movable detection position confirmation unit 43 provides the information on the maximum movable range to the movable masking area setting unit 45. The movable masking area setting unit 45 sets the masking pattern taking into consideration the movable range, based on the maximum movable range information. The masking pattern is recorded in the masking pattern recording unit 42 together with the provisionally registered masking pattern with the movable part static as described above. In other words, in the case where the maximum movable range is the range indicated by facial images 122a through 122c as shown in FIG. 10, the masking areas 131, 141, and 142 that include the range of movement in the horizontal direction are recorded as masking patterns in the masking pattern recording unit 42 as shown in FIG. 11. The masking area 131 is the area corresponding to the masking pattern 131 provisionally recorded in the process of Step S33. The masking area 141 is the area obtained by extending the masking area 131 in the figure horizontally to the right. The masking area 142 is the area obtained by extending the masking area 131 in the figure horizontally to the left.

According to the above process, for the facial image 122 shown in FIG. 7, the masking areas 131, 141, and 142 shown in FIG. 11 are set as masking patterns in the masking pattern recording unit 42. Therefore, for the facial image 122 shown on the poster, regardless of whether the automatic door 124-2 is open or closed, masking is applied by the masking process unit 31 to images 121 provided by the image acquisition unit 21 as shown in FIG. 11. Therefore the facial image is not detected, and during operating hours the facial image is not detected in the registered player notification process that is described later. However, the masking areas 131, 141, and 142 are sufficiently small with respect to the image 121.

Therefore, during operating hours the extraction of another facial image taken in image 121 is not affected, so the registered player notification process that is described later is not affected.

As a result, the registered player determination process that is described later is not affected. Therefore effectively it is possible to prevent recognition of only those facial images that are unnecessary to recognize as facial images. Also the recognition rate of the registered player determination process is not reduced, and it is possible to reduce the processing load. Furthermore, by executing the masking pattern setting process every day before operating hours as described above, even if actions such as changing posters or moving sign boards have been carried out within the premises, the masking patterns are updated every day. Therefore, it is possible to prevent detection of facial images that do not need to be detected as facial images, even without the awareness of the members of staff and so on of the updating of the masking patterns.

In the case of facial images on posters not fixed to the automatic doors 124-1, 124-2, even if the movable parts are operated the facial images do not move. In this case only the masking area 131 of FIG. 11 as described above will be recorded as a masking pattern in the masking pattern storage unit 42. Therefore the masking pattern becomes smaller, and the reduction in the recognition rate in determining a registered player by the registered player determination process can be further reduced. Also, if for example a cylindrical shaped sign board that rotates in a single direction is installed in the premises, the maximum movable range may be set with one revolution.

Also, in the process above, the facial image sub-division pattern was explained for the case of a scan line pattern. However, the masking pattern may also be set using a matrix type sub-division pattern.

Figure 12:
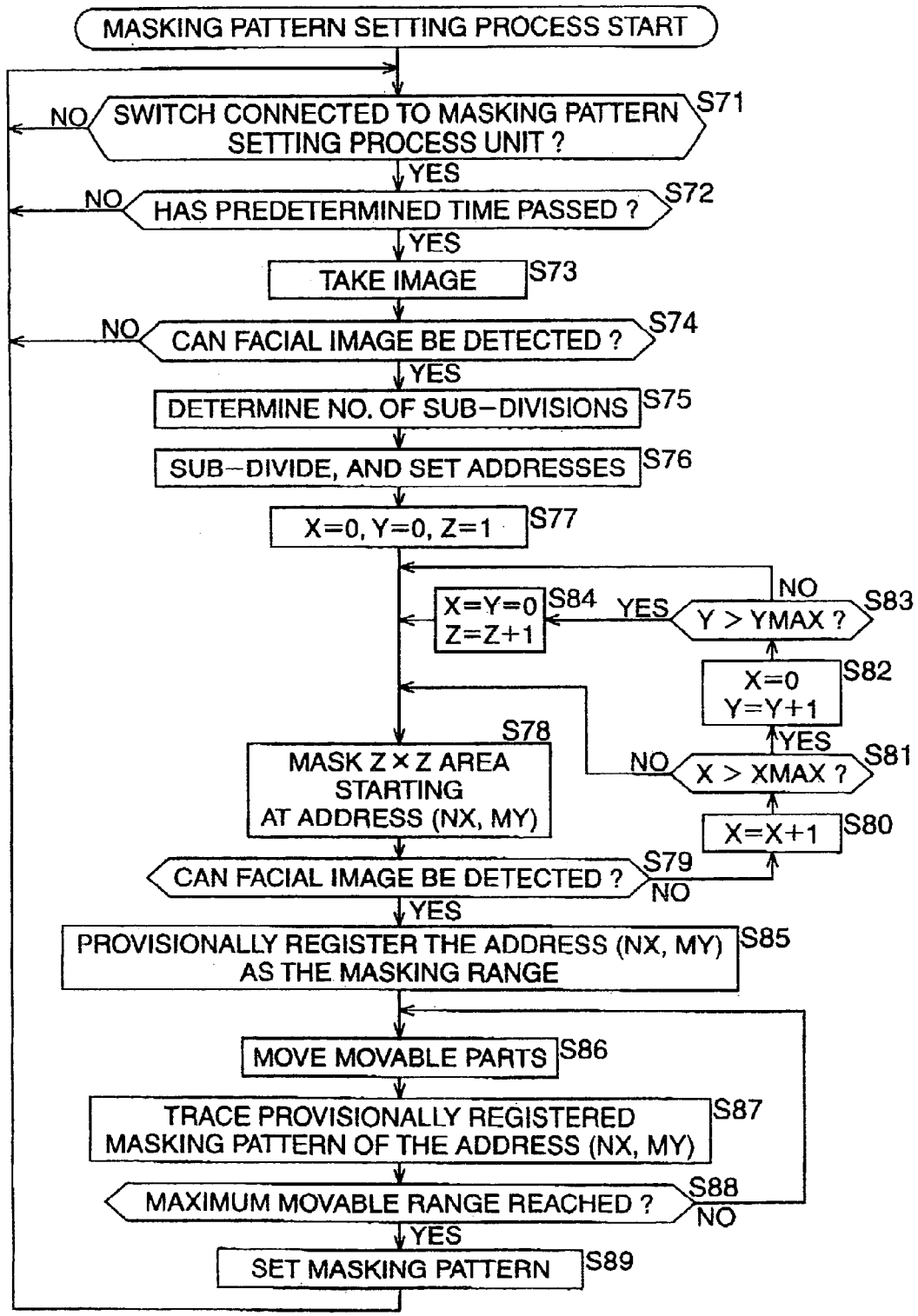
FIG. 12 is a flowchart explaining the masking pattern setting process when sub-dividing the facial image into a matrix form.

The flowchart in FIG. 12 explains the masking pattern setting process for the case where the facial image is sub-divided into a matrix form. In the flowchart of FIG. 12, the processes in Steps S71 through S74 and Steps S85 through S89 are the same processes as Steps S21 through S24 and Steps S34 through S37 that were explained with reference to FIG. 6. Therefore their explanation is omitted. Also, the processes in Steps S85, S86 differ from Steps S33, S35 only in that the address notation is different, the processes themselves are the same.

In Step S75, the masking pattern adjustment unit 41 controls the sub-division unit 41a to determine the number of sub-divisions. In this example the masking pattern is set in a matrix form, so the number of sub-divisions is determined for both the horizontal direction and the vertical direction.

Figure 13:
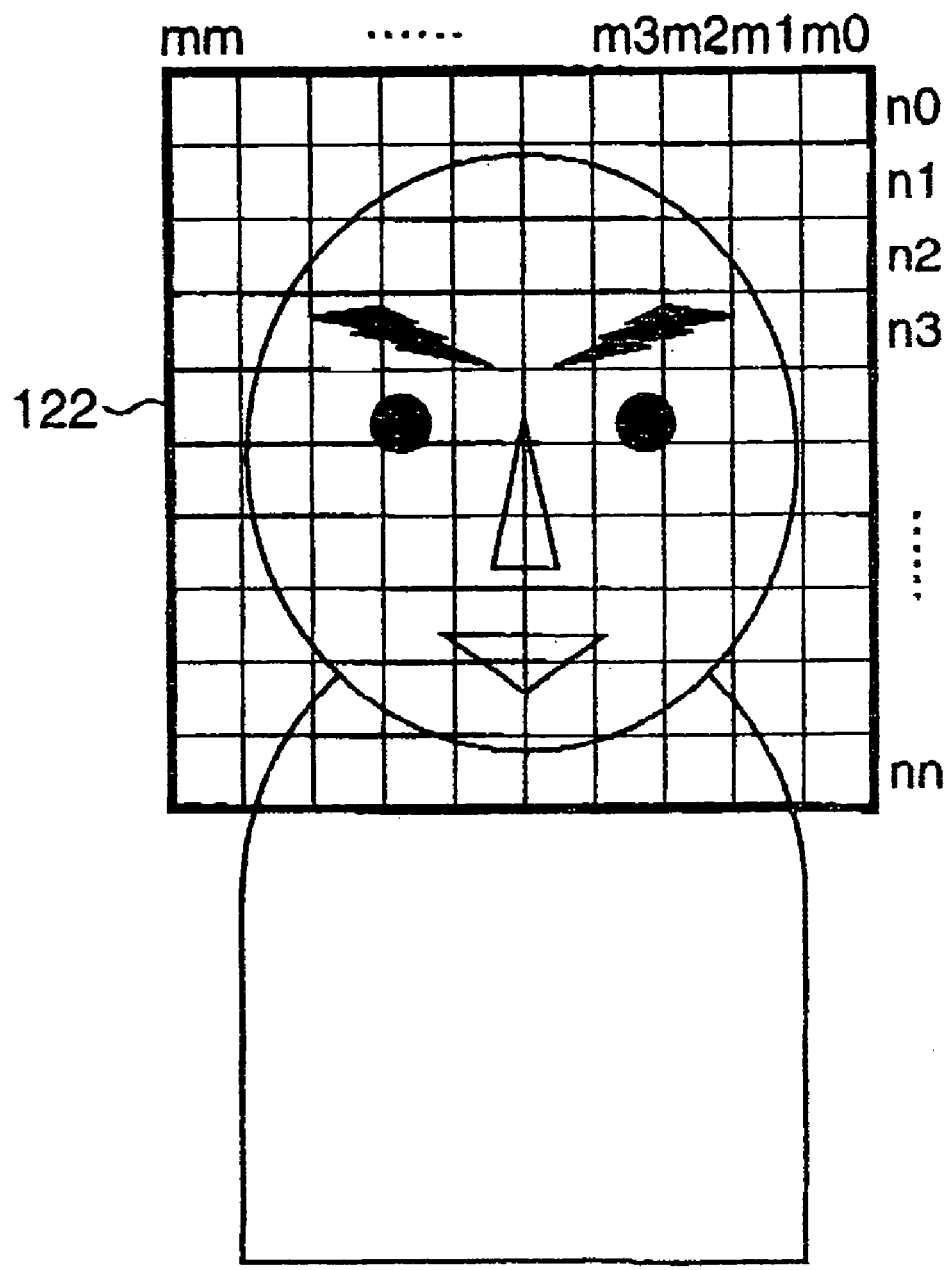
FIG. 13 is a diagram explaining the masking pattern setting process in the scan line sub-division process.

In Step S76, the sub-division unit 41a sub-divides the rectangular shaped facial image into the determined number of sub-divisions. The sub-division unit 41a sub-divides the facial image into a matrix form as shown in FIG. 13, for example, and sets the addresses. In FIG. 13 the facial image 122 is sub-divided in the horizontal direction towards the left into (m+1) divisions: m0 through mm. In the same way, the facial image 122 is sub-divided in the vertical direction towards the bottom into (n+1) divisions: n0 through nn. The address of each sub-divided part is set from (m0, n0) through (mm, nn).

In Step S77, the masking pattern adjustment unit 41 initializes counters X, Y, Z, which are not shown on the drawings, to X, Y=0, Z=1. The counters X, Y used here are counters for the address (mX, nY). The counter Z is a value indicating the minimum unit of the matrix that is masked.

In Step S78, the masking pattern adjustment unit 41 masks an area Z×Z with the address of the top right (mX, nY) as the starting point (or, the top left, bottom right, or bottom left may be used as the starting point). In other words, in this case X and Y are 0, and Z is 1, so an area 1×1 is masked starting from the address (m0, n0). As a result, the masking area 151a is applied to the topmost position of the rightmost column, as shown in the left hand side of FIG. 14.

In Step S79, the masking pattern adjustment unit 41 controls the facial image extraction unit 41b and checks whether a facial image can be extracted from the masked rectangular facial image or not. If it is determined that a facial image can be extracted, the process proceeds to Step S80. In other words, the facial image extraction unit 41b is the same as the facial image extraction unit 32, so if a facial image can be extracted it implies that a facial image that does not need to be processed as a facial image can be detected with the present masking pattern. Therefore, the process proceeds to the masking pattern change process.

In Step S80, the masking pattern adjustment unit 41 increments the counter X by 1. In Step S81, the masking pattern adjustment unit 41 determines whether the counter X is at the maximum value or not. If it is determined that the counter X is at the maximum value, the process returns to step S76, and masking is applied again. At this time the counter X is incremented by 1, so the matrix shaped masking pattern is moved one column to the left, as shown in the diagram second from the left in FIG. 14. Therefore the masking is applied to the masking area 151b one column to the left.

Figure 14:
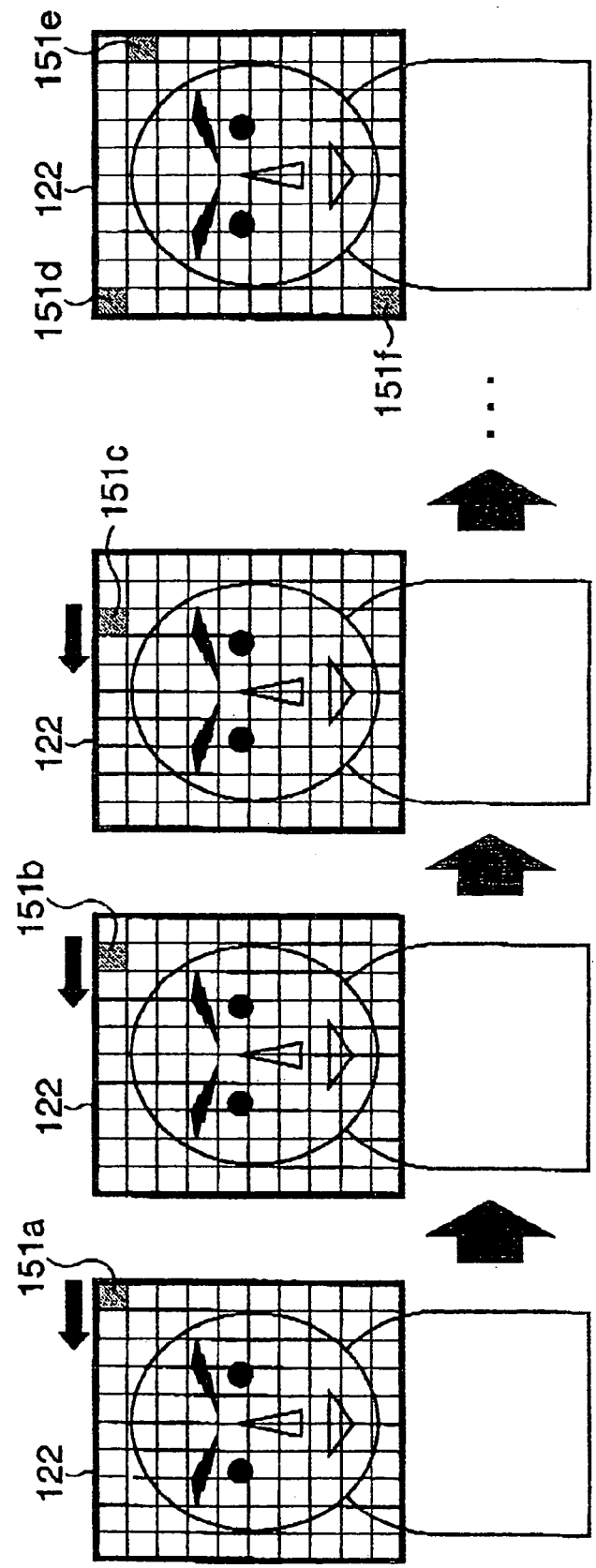
FIG. 14 is a diagram explaining the masking pattern setting process in the scan line sub-division process.

As a result, as shown in FIG. 14, the area masked is changed by moving successively to the left to masking area 151c ... as shown in FIG. 14, until a facial image cannot be extracted. Finally the masking is applied to masking area 151d in the leftmost column, as shown in the right hand side of FIG. 14.

At this time, in Step S81 X has reached the maximum value, so in Step S82 the counter X is initialized to zero, and the counter Y is incremented by one. In this way, the masking area 151e becomes masked, as shown in the right hand side of FIG. 14. Furthermore, in Step S83, the masking pattern adjustment unit 41 determines whether the Y counter has reached the maximum value or not. If it is determined that the maximum value has been reached, the process returns to Step 78, and the same process is repeated. In other words, the masking area is moved horizontally to the left, and when the masking area has moved to the leftmost column, the masking area is moved vertically downward and the same process is repeated. The result of this process is ultimately that masking is carried out successively until the masking area 151f shown in the diagram on the right hand side of FIG. 14 is reached. At this time, in Step S83 Y has reached the maximum value, and in Step S84 the masking pattern adjustment unit 41 initializes the counters X, Y to zero, increments the counter Z by one, and the process returns to Step S78.

Figure 15:
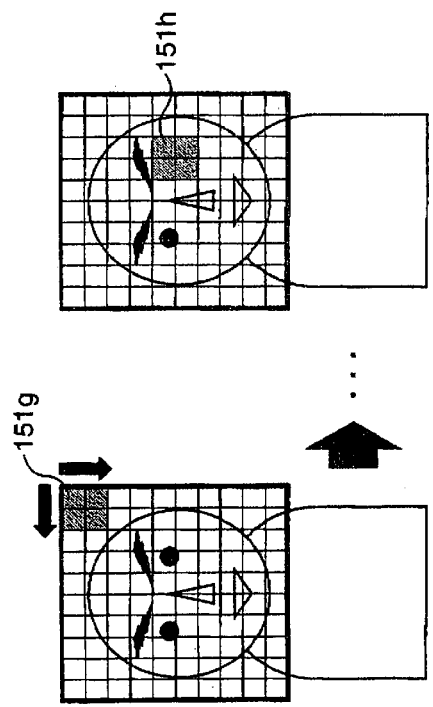
FIG. 15 is a diagram explaining the masking pattern setting process in the scan line sub-division process.

In other words, the counter Z has been incremented by one, so the masking area 151g becomes 2×2 as shown in the left hand side of FIG. 15. Therefore, the size of the masking area is four times that used previously. In this way the same process is repeated, moving the masking area horizontally and vertically downwards.

Then, as shown in the right hand side of FIG. 15, if one eye of the facial image becomes completely hidden by the masking area 151h, and if in Step S79 it is determined for example that a facial image cannot be extracted, then in Step S85 the masking pattern adjustment unit 41 records the masking pattern at that time (the masking pattern coordinates (mX, nY) and the masking size Z×Z) in the masking pattern recording unit 42. The registered masking pattern is provided to the movable detection position confirmation unit 43.

According to the above process, by sub-dividing the facial image in a matrix form and setting the masking pattern, facial images that do not need to be recognized as facial images, such as facial images on posters or sign boards or similar, are not recognized as facial images. Therefore, the processing load can be reduced, and the masking area can be made even smaller, so it is possible to reduce determination errors in the registered player determination process.

Figure 16:
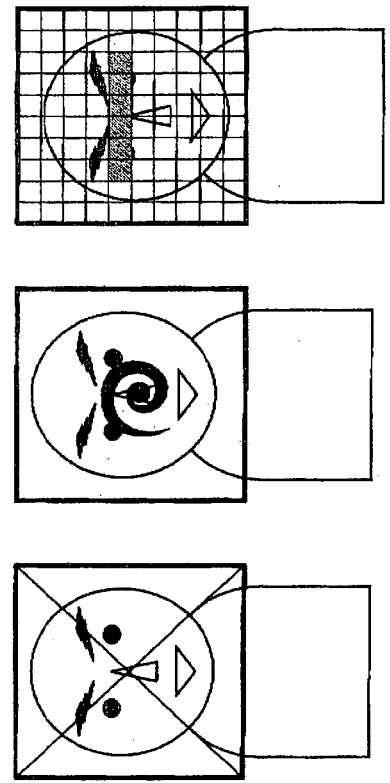
FIG. 16 is a diagram explaining the masking pattern setting process other sub-division processes.

In the above, an explanation has been given for an example in which masking areas sub-divided into a matrix form are moved successively in the horizontal and vertical directions, and when the condition in which the characteristic quantities cannot be obtained is detected, the masking pattern is set. However, the masking adjustment does not necessarily have to start from the top right; the movement can also proceed from any of the top left, the bottom right, or the bottom left. Also, as shown in the left hand side of FIG. 16, intersecting diagonal lines may be drawn, and using the picture element at the point of intersection as the center point, the masking area may be moved in a whirlpool form as shown in the center of FIG. 16, until it is detected that the characteristic quantities cannot be obtained. Furthermore, diagonal lines may be drawn as shown in the left hand side of FIG. 16, and using the picture element at their point of intersection the masking area can be extended to the left and right as shown in the right hand side of FIG. 16 until it is detected that a facial image cannot be extracted.

Figure 17:
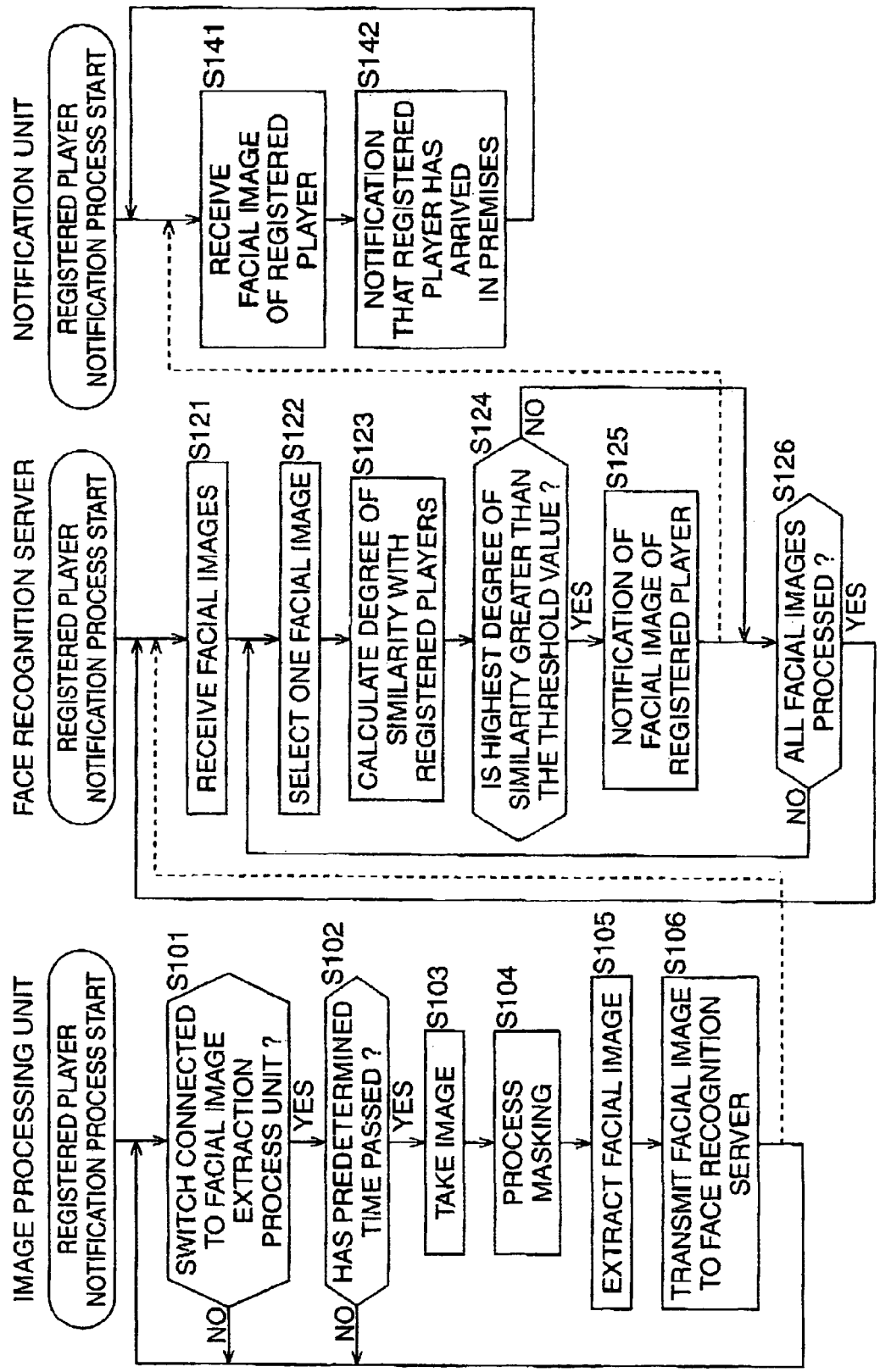
FIG. 17 is a flowchart explaining the registered player notification process.

Next, the registered player notification process of the registered player arrival notification system of FIG. 1 is explained with reference to the flowchart of FIG. 17.

In Step S101, the facial image extraction process unit 23 determines whether the switch 22 is connected to the facial image extraction process unit 23, and the process is repeated until it is determined that the switch 22 is connected. If for example it is determined that the switch 22 is connected, the process proceeds to Step S102.

In Step S102, the camera 1 determines whether a predetermined period of time has passed, and the process is repeated until the predetermined period of time has passed. An arbitrary time may be set as the predetermined time for the surveillance sampling time, for example 250 ms may be used.

In Step S102, if it is determined that the predetermined period of time has passed, in Step S103 the camera 1 takes an image of the area the camera 1 is set up to take, and the image is provided to the image processing unit 2. The image acquisition unit 21 of the image processing unit 2 receives the image provided, and provides the image to the facial image extraction process unit 23.

In Step S104, the masking process unit 31 of the facial image extraction process unit 23 interrogates the masking pattern recording unit 42, and reads the masking pattern that was set by the masking pattern setting process as described above. The masking process unit 31 masks the image provided by the image acquisition unit 21 based on the masking pattern that was read, and provides the masked facial image to the facial image extraction unit 32.

In Step S105, the facial image extraction unit 32 extracts facial images of a player from the provided images, and supplies the facial images to the transmission unit 33. More specifically, the facial image extraction unit 32 extracts the facial image from the color of the part where the skin is exposed in the image, and the arrangement of characteristic parts such as the eyes and nose, for example. Furthermore, after extracting the corresponding rectangular facial images, the facial image extraction unit 32 provides the facial images to the transmission unit 33. Furthermore, in Step S106, the transmission unit 33 transmits the facial images to the face recognition server 3.

In Step S121, the image acquisition unit 81 of the face recognition server 3 receives the facial images. In Step S122, the facial image extraction unit 81 selects one unprocessed image from among the facial images provided, and provides the facial image to the degree of similarity calculation unit 82.

In Step S123, the degree of similarity calculation unit 82 calculates the degree of similarity of the selected facial image and the facial images of registered players already registered in the registered player database 83.

Based on the information in the registered player database 83, the degree of similarity calculation unit 82 obtains various types of characteristic quantities for the facial image provided by the facial image acquisition unit 81. The characteristic quantities can include the distance between the eyes, the ratio of the distance from the chin to the forehead and the distance from the chin to the nose, and so on, as described above. The degree of similarity is calculated as the sum of differences, average ratios, sum of ratios, or the like. The degree of similarity of the registered player with the closest resemblance and the corresponding facial image are provided to the determination unit 84.

In Step S124, the determination unit 84 determines whether the degree of similarity provided by the degree of similarity calculation unit 82 is larger than a predetermined threshold value or not. In other words, here it is assumed that the higher value of the degree of similarity the greater the resemblance between the facial image of the registered player and the facial image in question. Therefore, the degree of similarity of the facial image in question and the facial image of the registered player having the greatest resemblance is compared with the predetermined threshold value. As stated above, depending upon the definition of the degree of similarity, the value of the degree of similarity between the facial image in question and the facial image of the registered player with the greatest resemblance is not necessarily the largest. Therefore, the greater-than/less-than relationship between the degree of similarity and the threshold value differs depending on the example.

In Step S124, if it is determined that the degree of similarity provided by the degree of similarity calculation unit 82 is larger than the threshold value (threshold value of degree of similarity for determining a registered player), in Step S125 the determination unit 84 considers the selected facial image to be the facial image of a registered player, and provides the selected facial image to the notification unit 4.

In Step 141, the notification unit 4 receives the facial image provided by the face recognition server 3 as a result of the process in Step S125. In Step S142 a display, speaker, or similar, which are not shown on the drawings, are controlled to notify the members of staff of the arrival of a registered player.

On the other hand, in Step S124, if it is determined that the degree of similarity provided by the degree of similarity calculation unit 82 is not larger than the threshold value, the process of Step S125 is skipped, and the members of staff are not notified of the arrival of a registered player.

In Step S126, the facial image extraction unit 81 determines whether all the facial images have been processed or not. If it is determined that all the facial images have not been processed, the process returns to Step S122.

Furthermore, in Step S126, if it is determined that all the facial images have been processed, the process returns to Step S121.

According to the above, in the registered player arrival notification system, a facial image is extracted from an image masked in the process of Step S104 with the masking pattern set in the masking pattern setting process. Therefore, it is possible to prevent the facial image extraction unit 32 from extracting facial images on posters or sign boards, or the like. As a result the process of calculating one by one the degree of similarity of facial images that do not need to be regarded as visitors with the facial images of registered players is eliminated. Therefore, comparison of the degree of similarity with the facial images of registered players is only carried out for the facial images of visitors that are required to be extracted. As a result, unnecessary calculation of degree of similarity and determination processes are eliminated, and the processing load is reduced. In addition, even in the rare event that the facial image on a poster or sign board resembles the facial image of a registered player, it is possible to prevent erroneous detection.

Furthermore, the masking pattern is gradually increased in size from the minimum state until it is determined that a facial image cannot be extracted from a poster or sign board. The pattern is set when finally a facial image cannot be detected. As a result, the minimum necessary masking pattern is set, so it is possible to minimize the effect of the masking pattern on the facial images of players that are to be detected. Erroneous detection (including failure to detect the facial image of a player that should be detected even though the player has arrived) can be reduced, and the detection rate (the rate of detection of facial images of the players that have arrived, when players that are to be detected have arrived) can be improved.

According to the above, in the image processing device, method, and program according to one aspect of the present invention, images are taken, facial images are extracted from these images, masking patterns are generated for masking part of these images, and the masking patterns are repeatedly changed until facial images that are not the facial images of visitors cannot be extracted from the images. The masking pattern is recorded when by masking the image using the generated masking pattern, facial images that are not the facial images of visitors cannot be extracted from the images. As a result, by masking an image using the masking pattern and extracting facial images from the masked images, erroneous detection of registered players can be reduced, and the detection rate can be increased. Furthermore the processing load can be reduced by preventing the detection of facial images that do not need to be processed by masking.

The series of surveillance processes described above may be implemented by hardware or by software. If the series of processes are implemented using software, the program that constitutes this software is installed from a recording medium onto a computer or for example a multi-purpose personal computer that is capable of executing many types of function by installing many types of program, that incorporates dedicated hardware.

Figure 18:
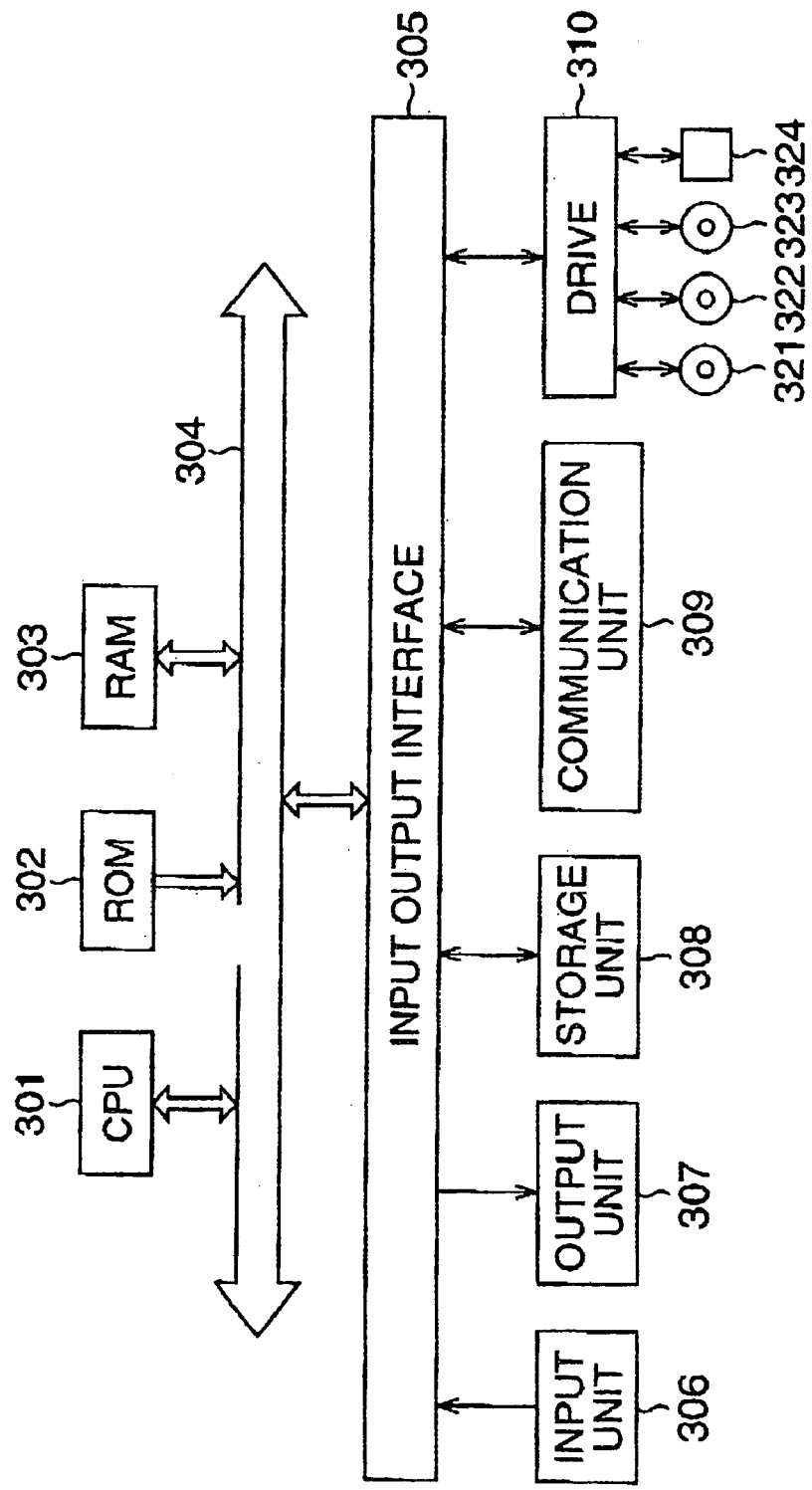
FIG. 18 is a diagram explaining the media.

FIG. 18 shows an example of the configuration of a multi-purpose personal computer. This personal computer includes a central processing unit (CPU) 301. The CPU 301 is connected to an input output interface 305 via a bus 304. The bus 304 is connected to a read only memory (ROM) 302, and a random access memory (RAM) 303.

The input output interface 305 is connected to an input unit 306 that includes a keyboard from which a user can input operation commands, a mouse, and other input devices; an output unit 307 that outputs process operation screens and process results screens to display devices; a storage unit 308 that includes a hard disk drive and the like on which programs and many types of data are stored; and a communication unit 309 that includes a local area network (LAN) adapter or the like, and that executes communication processes via a network such as the internet. Also, the input output interface 305 is connected to a drive 310 that reads data from and writes data to memory media such as magnetic discs 321 (including flexible disks), optical disks 322 (compact disc-read only memory (CD-ROM)), digital versatile discs (DVD), opto-magnetic discs 323 (including mini discs (MD)), or semiconductor memory 324.

The CPU 301 executes many types of process in accordance with programs recorded in the ROM 302, or programs read from any of the storage devices (the magnetic disc 321, . . . semiconductor memory 324) connected to the drive 310 and installed in the storage unit 308, and loaded from the storage unit 308 to the RAM 303. The RAM 303 also stores data necessary for the execution of many types of process in the CPU 301 as required.

In the present patent specification, steps describing a program recorded on a recording medium are processes carried out sequentially in a time series in accordance with the stated order. However, the program does not necessarily have to be processed as a time series, processes may also be executed in parallel or individually.

Also, in the present patent specification, "system" refers to the an entire device that is constituted of a plurality of devices.

What is claimed is:

1. An image processing device, comprising:
   imaging means that takes an image;
   facial image extraction means that extracts a facial image from the image;
   masking pattern generation means that generates a masking pattern to mask a part of an image, and repeatedly changes the masking pattern until a state where a facial image other than the facial image of a visitor cannot be extracted from the image by the facial image extraction means; and
   recording means that records the masking pattern when the facial image extraction means cannot extract the facial image other than the facial image of a visitor from the image that has been masked using the masking pattern generated by the masking pattern generation means.

2. The image processing device according to claim 1, wherein
   the masking pattern generation means further comprises sub-division means that sub-divides the facial image into predetermined sub-division areas, and
   the masking pattern generation means generates masking patterns that mask a part of the facial image using units of the sub-divided areas sub-divided by the sub-division means, and the position and size of the masking pattern is repeatedly changed in units of the sub-divided areas sub-divided by the sub-division means until a state where a facial image other than the facial image of a visitor cannot be extracted from the image by the facial image extraction means.

3. The image processing device according to claim 2, wherein the predetermined sub-division areas include areas of the sub-divided image in a scan line form, or areas of the sub-divided image in a matrix faun.

4. The image processing device according to claim 3, wherein if the predetermined sub-division areas are areas sub-divided in a matrix form, the masking pattern generation means generates the masking pattern for masking by changing the size of part of the sub-divided area while successively moving the facial image in a whirlpool shape from an area in approximately the center of a facial image other than the facial image of a visitor.

5. The image processing device according to claim 1, wherein the facial image other than the facial image of a visitor is a facial image extracted by the facial image extraction means from an image taken by the imaging means under conditions in which no visitors are present.

6. The image processing device according to claim 1, further comprising:
   detection means that detects positions of movement of movable equipment; and
   tracing means that traces the masking pattern generated by the masking pattern generation means in a state where the facial image generation means cannot extract a facial image from the image taken by the imaging means, based on the positions of movement detected by the detection means,
   wherein the masking pattern recording means records the masking pattern including a range that the masking pattern has been traced by the tracing means.

7. A surveillance device, comprising:
   accumulation means that accumulates facial images of registered persons;
   masking means that masks the images using masking patterns recorded in the recording means according to claim 1;
   degree of similarity calculation means that calculates the degree of similarity between the facial images extracted by the facial image extraction means and the facial images of registered persons accumulated in the accumulation means, based on characteristic quantities for recognizing the facial images from the facial images extracted by the facial image extraction means from the images masked by the masking means; and
   determination means that determines whether a registered person is present or not based on the degree of similarity calculated by the degree of similarity calculation means.

8. An image processing method, comprising:
   an imaging step of taking an image;
   a facial image extraction step of extracting a facial image from the image;
   a masking pattern generation step of generating a masking pattern for masking a part of the image, and repeatedly changing the masking pattern until a state where a facial image other than the facial image of a visitor cannot be extracted from the image, by the process in the facial image extraction step; and
   a recording step of recording the masking pattern when the facial image extraction means cannot extract a facial image other than the facial image of a visitor from the image that has been masked using the masking pattern generated in the process of the masking pattern generation step.

9. A program stored on non-transitory computer readable medium, comprising:
   an imaging step of taking an image;
   a facial image extraction step of extracting a facial image from the image;
   a masking pattern generation step of generating a masking pattern for masking apart of the image, and repeatedly changing the masking pattern until a state where a facial image other than the facial image of a visitor cannot be extracted from the image by the process in the facial image extraction step; and
   a recording step of recording the masking pattern when the facial image extraction means cannot extract a facial image other than the facial image of a visitor from the image that has been masked using the masking pattern generated in the process of the masking pattern generation step.

* * * * *